(12) United States Patent
Matsuoka et al.

(10) Patent No.: US 11,865,721 B2
(45) Date of Patent: Jan. 9, 2024

(54) WORK DETERMINATION APPARATUS AND WORK DETERMINATION METHOD

(71) Applicant: Mitsubishi Electric Corporation, Tokyo (JP)

(72) Inventors: Satoru Matsuoka, Tokyo (JP); Kiyoshi Maekawa, Tokyo (JP); Hideki Asoh, Ibaraki (JP); Kensuke Harada, Ibaraki (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 224 days.

(21) Appl. No.: 17/299,785

(22) PCT Filed: Dec. 19, 2019

(86) PCT No.: PCT/JP2019/049929
§ 371 (c)(1),
(2) Date: Jun. 4, 2021

(87) PCT Pub. No.: WO2020/158239
PCT Pub. Date: Aug. 6, 2020

(65) Prior Publication Data
US 2022/0016770 A1    Jan. 20, 2022

(30) Foreign Application Priority Data
Feb. 1, 2019   (JP) .................................. 2019-017080

(51) Int. Cl.
  *B25J 9/16*    (2006.01)
  *B25J 13/08*   (2006.01)
  *G06N 3/049*   (2023.01)

(52) U.S. Cl.
  CPC ........... *B25J 9/1653* (2013.01); *B25J 9/1674* (2013.01); *B25J 9/1687* (2013.01); *B25J 13/085* (2013.01); *B25J 13/089* (2013.01); *G06N 3/049* (2013.01)

(58) Field of Classification Search
  CPC ........ B25J 9/1653; B25J 9/161; B25J 9/1674; B25J 9/1687; B25J 13/085; B25J 13/089;
  (Continued)

(56) References Cited

U.S. PATENT DOCUMENTS 5,912,540 A * 6/1999 Kosaka .................. B25J 9/1674
                                                                318/568.14
8,369,983 B2 * 2/2013 Sato ....................... B25J 9/1633
                                                                700/254
(Continued)

FOREIGN PATENT DOCUMENTS

CN         107921626 A      4/2018
DE    10 2016 008 987 A1    2/2017
(Continued)

OTHER PUBLICATIONS

German Office Action dated Nov. 9, 2022, in corresponding German Patent Application 112019006789.3, 12pp.
(Continued)

*Primary Examiner* — Adam R Mott
*Assistant Examiner* — Sagar K C
(74) *Attorney, Agent, or Firm* — XSENSUS LLP

(57) ABSTRACT

It is an object of the present invention to obtain a work determination apparatus capable of preventing or reducing a time lag between the occurrence and determination of an anomaly in work. A work determination apparatus includes: a sensor data output unit that outputs sensor data with an output interval of an integral multiple of a control period with which a motion of a robot is controlled, the sensor data
(Continued)

representing a state of work of the robot; and a determination unit that determines a quality of the work of the robot by inference using a recurrent neural network, based on the sensor data outputted from the sensor data output unit.

20 Claims, 8 Drawing Sheets

(58) Field of Classification Search
CPC .......... G06N 3/049; G05B 2219/40033; G05B 2219/40224; G05B 23/0289
See application file for complete search history.

(56) References Cited

U.S. PATENT DOCUMENTS

| | | | |
|---|---|---|---|
| 9,889,566 B2 | 2/2018 | Tan et al. | |
| 10,016,900 B1* | 7/2018 | Meyer | G05B 19/00 |
| 10,252,424 B2 | 4/2019 | Tan et al. | |
| 10,618,176 B2* | 4/2020 | Takahashi | B25J 9/1687 |
| 2010/0057256 A1* | 3/2010 | Sato | B25J 13/085 700/258 |
| 2015/0266182 A1* | 9/2015 | Strandberg | B25J 9/1676 700/255 |
| 2015/0290798 A1* | 10/2015 | Iwatake | B25J 13/085 700/257 |
| 2015/0306767 A1* | 10/2015 | Saito | B25J 9/1676 901/1 |
| 2016/0318187 A1 | 11/2016 | Tan et al. | |
| 2017/0031329 A1 | 2/2017 | Inagaki et al. | |
| 2018/0126553 A1* | 5/2018 | Corkum | B25J 9/1697 |
| 2018/0154525 A1 | 6/2018 | Tan et al. | |
| 2018/0169854 A1 | 6/2018 | Shiratsuchi | |
| 2018/0210416 A1 | 7/2018 | Azizan et al. | |
| 2018/0272535 A1* | 9/2018 | Ogawa | B25J 13/085 |
| 2018/0342774 A1 | 11/2018 | Shimada | |
| 2019/0070734 A1* | 3/2019 | Wertenberger | B25J 15/0616 |
| 2019/0265657 A1 | 8/2019 | Inagaki et al. | |
| 2019/0291271 A1* | 9/2019 | Hayashi | B25J 9/161 |
| 2019/0344451 A1* | 11/2019 | Miyazawa | B25J 9/1674 |
| 2020/0086488 A1* | 3/2020 | Sato | B25J 9/1653 |
| 2020/0223065 A1* | 7/2020 | Hane | B25J 9/1674 |
| 2022/0146993 A1 | 5/2022 | Inagaki et al. | |

FOREIGN PATENT DOCUMENTS

| | | | |
|---|---|---|---|
| DE | 11 2016 002 797 T5 | 3/2018 | |
| EP | 2 383 079 A23 | 2/2011 | |
| EP | 3 355 140 A1 | 8/2018 | |
| JP | 6-331683 A | 12/1994 | |
| JP | 9-123078 A | 5/1997 | |
| JP | 2011-104740 A | 6/2011 | |
| JP | 2012-171071 A | 9/2012 | |
| JP | 2016-221660 A | 12/2016 | |
| JP | 2018-27577 A | 2/2018 | |
| JP | 2018-120399 A | 8/2018 | |
| JP | 2018-200306 A | 12/2018 | |
| WO | WO-2015109555 A1 * | 7/2015 | ........... B25J 9/1687 |
| WO | 2016/208467 A1 | 12/2016 | |

OTHER PUBLICATIONS

International Search Report and Written Opinion dated Mar. 17, 2020, received for PCT Application PCT/JP2019/049929, Filed on Dec. 19, 2019, 15 pages including English Translation.
Motoyama et al., "Pin Insertion Operation by a Robot Using the Time History of the Force Signal", 29th Annual Conference of the Robotics Society of Japan, Sep. 7, 2011, 11 pages (Including English Translation).
Office Action dated Feb. 27, 2023, in corresponding German patent Application No. 112019006789.3, 14 pages.
Japanese Office Action dated Aug. 27, 2021 in Japanese Application No. 2019-017080.
Office Action dated Sep. 23, 2023, in corresponding Chinese patent Application No. 201980090472.1, 15 pages.

* cited by examiner

WORK DETERMINATION APPARATUS AND WORK DETERMINATION METHOD

CROSS-REFERENCE TO RELATED APPLICATIONS

The present application is based on PCT filing PCT/JP2019/049929, filed Dec. 19, 2019, which claims priority to JP 2019-017080, filed Feb. 1, 2019, the entire contents of each are incorporated herein by reference.

FIELD

The present invention relates to a work determination apparatus and a work determination method for determining the quality of work performed by an industrial machine such as a robot.

BACKGROUND

When work is performed by use of an industrial machine such as a robot, the quality of the work is determined by use of time-series data acquired by a sensor installed in the industrial machine. In this case, an apparatus that determines the quality of work generally extracts a feature quantity such as an amplitude value from the time-series data for each predetermined duration of time, and compares the feature quantity with a benchmark to determine the quality of the work. It is desirable to shorten the duration of time in order to minimize a time lag from anomalous occurrence to determination thereof. However, shortening the duration of time lowers determination accuracy.

Patent Literature 1 discloses a determination apparatus that extracts a plurality of feature quantities with different durations of time, and determines the quality of work on the basis of whether or not the plurality of feature quantities satisfies evaluation criteria, so as to minimize a time lag from the anomalous occurrence to the determination thereof and achieve high determination accuracy at the same time.

CITATION LIST

Patent Literature

Patent Literature 1: Japanese Patent Application Laid-open No. 2018-27577

SUMMARY

Technical Problem

However, since a certain time period worth of data sets are stored and the stored data sets are used to calculate the feature quantities, the technique disclosed in Patent Literature 1 has a problem in that there is still caused a time lag between the anomalous occurrence and the determination thereof.

The present invention has been made in view of the above circumstances, and an object of the present invention is to provide a work determination apparatus capable of minimizing a time lag between the anomalous occurrence and the determination thereof in work.

Solution to Problem

In order to solve the above-described problem and achieve the object, the present invention provides a work determination apparatus comprising: a sensor data output unit to output state data with an output interval of an integral multiple of a control period with which a motion of an industrial machine is controlled, the state data representing a state of work of the industrial machine; and a determination unit to determine a quality of the work of the industrial machine by inference using a recurrent neural network, based on the state data outputted from the sensor data output unit.

Advantageous Effects of Invention

The work determination apparatus according to the present invention has an advantageous effect of enabling minimization of a time lag between the anomalous occurrence and the determination thereof in work.

DESCRIPTION OF EMBODIMENTS

Hereinafter, work determination apparatuses and work determination methods according to embodiments of the present invention will be described in detail with reference to the drawings. Note that the present invention is not necessarily limited to the embodiments.

First Embodiment

Figure 1:
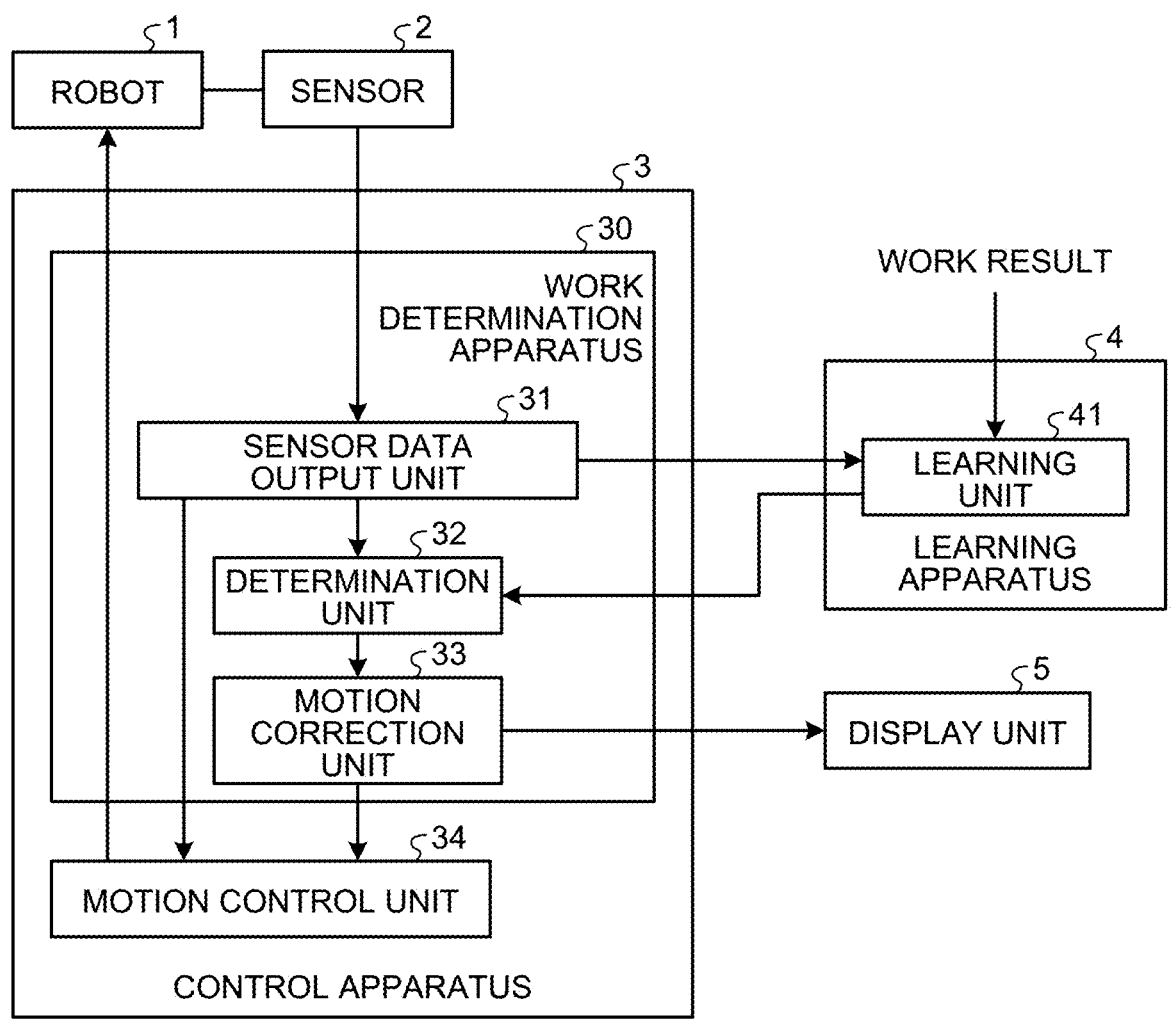
FIG. 1 is a diagram illustrating a configuration example of a mechanical system including a work determination apparatus according to a first embodiment of the present invention.

FIG. 1 is a diagram illustrating a configuration example of a mechanical system including a work determination apparatus according to a first embodiment of the present invention. As illustrated in FIG. 1, the mechanical system includes a robot 1, a sensor 2 installed in the robot 1, a control apparatus 3, a learning apparatus 4, and a display unit 5.

Hereinafter, the robot 1 will be described as an example of an industrial machine in the present embodiment, which performs assembly work such as cover assembly, connector insertion, board insertion, and shaft fitting. The present embodiment is not limited to the robot 1 that performs an assembly work, and can be applied to some industrial machines such as a robot that performs work other than the assembly work, a machine that performs processing such as cutting, and a packaging machine.

The sensor 2 is installed in the robot 1, and detects the state of the work of the robot 1, the state of surroundings of the robot 1, a state quantity inside the robot 1, and the like. The sensor 2 includes a force sensor in a case of the present embodiment. The force sensor is attached to, for example, a wrist of the robot 1. The force sensor periodically detects forces (Fx, Fy, Fz) in three axis directions and moments (Mx, My, Mz) around the three axes of the robot 1, and outputs the detection results as sensor data to the control apparatus 3. A period with which the sensor 2 detects the state of the work of the robot 1, the state of surroundings of the robot 1, the state quantity inside the robot 1, and the like is hereinafter referred to as a sampling period.

The control apparatus 3 uses the sensor data outputted from the sensor 2 to control the robot 1 according to a robot program for controlling the motion of the robot 1. When the robot 1 performs a work, the control apparatus 3 controls the motion of the robot 1 so that a specified work is performed according to the robot program. For example, the position of a fingertip of the robot 1 is defined in the robot program. The control apparatus 3 controls the robot 1 with generating a motion command for causing the robot 1 to make a motion, for each control period. A description will be given below based on the assumption that the control period is equal to the sampling period. However, the control period may be different from the sampling period.

The control apparatus 3 has a function as a work determination apparatus 30 according to the first embodiment. The control apparatus 3 uses the sensor data outputted from the sensor 2 to determine the quality of the work of the robot 1, that is, the presence or absence of an anomaly. Specifically, the control apparatus 3 determines, for example, a work class indicating the goodness or badness of the work. The work class is a value indicating the quality of the work, and is a value indicating the degree of normality of the work or the type of the anomaly. The work class is not limited to a binary value for good or bad, and may indicate an intermediate state between good and bad. In addition, the number of anomalies is not limited to one, and a combination of two or more values may be used as the types of the anomaly. In the following description, determining the quality of work includes determining the work class. Note that an example in which the control apparatus 3 that controls the robot 1 has a function as the work determination apparatus 30 will be described in the present embodiment, but the work determination apparatus 30 may be provided separately from the control apparatus 3 that controls the robot 1.

The learning apparatus 4 uses an inputted work result and the sensor data outputted from the control apparatus 3 to perform learning for work quality determination performed by the control apparatus 3, and outputs the result of learning to the control apparatus 3. Note that although an example in which the learning apparatus 4 is provided separately from the control apparatus 3 will be described here, the learning apparatus 4 and the control apparatus 3 may be integrated with each other. Furthermore, the work determination apparatus 30 may be provided separately from the control apparatus 3 that controls the robot 1, and the work determination apparatus 30 and the learning apparatus 4 may be integrated with each other.

The display unit 5 displays the state of the work of the robot 1 and the like on the basis of an instruction from the control apparatus 3. The display unit 5 may be a liquid crystal monitor, a display module, or the like, or may be an indicator light such as a rotating light. In addition, the display unit 5 may also provide sound notification with a buzzer or the like. An example in which the display unit 5 is provided separately from the control apparatus 3 will be described in the present embodiment. However, the display unit 5 and the control apparatus 3 may be integrated with each other. Alternatively, the display unit 5 and the learning apparatus 4 may be integrated with each other.

Next, the configuration of the control apparatus 3 will be described. As illustrated in FIG. 1, the control apparatus 3 includes a sensor data output unit 31, a determination unit 32, a motion correction unit 33, and a motion control unit 34. The sensor data output unit 31 outputs data representing the state of the work of the robot 1 at output intervals each of which has an integral multiple of the control period with which the motion of the robot 1 is to be controlled. In the present embodiment, the output interval is one time the control period. Specifically, the sensor data output unit 31 receives sensor data outputted from the force sensor for each sampling period, that is, for each control period. The sensor data includes the forces (Fx, Fy, Fz) in the three-axis directions and the moments (Mx, My, Mz) around the three axes. Then, the sensor data output unit 31 outputs the forces (Fx, Fy, Fz) in the three-axis directions to the determination unit 32, for each control period. That is, state data to be outputted by the sensor data output unit 31 are at least part of the sensor data outputted from the sensor 2 in the present embodiment. In this example, the forces (Fx, Fy, Fz) in the three axis directions correspond to the state data.

The determination unit 32 determines the presence or absence of an anomaly in the work of the robot 1 by inference using a recurrent neural network (RNN) based on the data outputted from the sensor data output unit 31. Specifically, the determination unit 32 determines the quality of the work of the robot 1 by inference using an RNN learning model generated by the learning apparatus 4. For example, the determination unit 32 obtains, for each control period, output data representing the state of the work of the robot 1 with use of the learning model with the forces (Fx, Fy, Fz) in the three axis directions outputted from the sensor data output unit 31 being set as inputs. Then, the determination unit 32 determines the quality of the work of the robot 1, that is, the presence or absence of an anomaly in the work on the basis of the output data. Furthermore, when the determination unit 32 determines that the work is anomalous, the determination unit 32 may also determine the type of the anomaly. Here, two types of anomaly, that is, misalignment and parts anomaly, will be described as examples of the type of anomaly. However, the number of anomaly types may be one, or may be three or more. The parts anomaly refers to an anomaly related to a component part, such as a partial defect in a part or undesired adhesion of foreign matter to a part. Furthermore, a format of the data representing a determination result is not limited to the above-described example. The determination unit 32 outputs a determination result to the motion correction unit 33. The RNN is an example of machine learning that uses time-series data as an input thereof. Details of the determination unit 32 will be described later.

The motion correction unit 33 performs control so that the motion of the robot 1 is corrected, on the basis of the result of determination obtained by the determination unit 32. The motion correction unit 33 does not particularly operate when the determination result inputted from the determination unit 32 has a value indicating normality. When the determination result inputted from the determination unit 32 has a value indicating an anomaly of misalignment, the motion correction unit 33 instructs the display unit 5 to display the anomaly of misalignment, and corrects the motion of the robot 1 so that the robot 1 operates to address the anomaly of misalignment. Specifically, the motion correction unit 33 generates, as a motion correction command, a command to, for example, temporarily stop the robot 1, return the robot 1 to a predetermined position, perform a search operation, and resume the work, and then the motion correction unit 33 outputs the motion correction command to the motion control unit 34. In the search operation, a search is made for a correct position for an insertion work, based on values of the force sensor, a tactile sensor, and the like installed in the robot 1. For example, in the case of a work of inserting a connector into a pin without a cover, the connector held by the robot 1 is thrust at a low speed from a plurality of directions to derive the position of the pin, and the connector insertion work is performed again at the derived position. Furthermore, when the determination result inputted from the determination unit 32 has a value indicating a parts anomaly, the motion correction unit 33 instructs the display unit 5 to display the parts anomaly, and corrects the motion of the robot 1 so that the robot 1 operates to address the parts anomaly. Specifically, the motion correction unit 33 generates, as a motion correction command, a command to, for example, temporarily stop the robot 1, thereafter return the robot 1 to the predetermined position, and stop the robot 1 again, and then the motion correction unit 33 outputs the motion correction command to the motion control unit 34. As described above, when the determination unit 32 determines that there is an anomaly of misalignment of the robot 1, the motion correction unit 33 performs control in such a way as to cause the robot 1 to return to the predetermined position and then perform the work again, and on the other hand when the determination unit 32 determines that there is a parts anomaly, the motion correction unit 33 performs control in such a way as to stop the robot 1.

The motion control unit 34 uses the sensor data outputted from the sensor data output unit 31 to generate a motion command to operate the robot 1 for each control period, and outputs the motion command to the robot 1. Furthermore, when the motion control unit 34 receives the motion correction command from the motion correction unit 33, the motion control unit 34 stops the output of a regular motion command, and outputs, to the robot 1, the motion correction command received from the motion correction unit 33.

The learning apparatus 4 is, for example, a computer such as a personal computer (PC), which includes a learning unit 41. The learning unit 41 performs machine learning using teacher data, also called training data, before the robot 1 starts an assembly work in actual production. For example, the RNN can be used for the machine learning as described above. In the present embodiment, the determination unit 32 of the control apparatus 3 incorporates a learning model that has experienced learning performed using the teacher data by the learning unit 41. As described above, the determination unit 32 determines the quality of the work of the robot 1 with use of results obtained based on this learning model with the forces (Fx, Fy, Fz) in the three axis directions outputted from the sensor data output unit 31 being set as inputs thereof.

Next, the machine learning in the learning unit 41 of the learning apparatus 4, and the determination unit 32 of the control apparatus 3 will be described in more detail. First of all, the machine learning in the learning unit 41 will be described. Before the robot 1 starts an assembly work in the actual production, the learning unit 41 performs the machine learning using teacher data corresponding to each of states including at least a first state, a second state, and a third state to be described below.

The first state is a state in which the assembly work is normally completed. An operator causes the robot 1 to perform an assembly work before starting the assembly work in actual production. As input data, the learning unit 41 of the learning apparatus 4 stores, in the learning apparatus 4, the forces (Fx, Fy, Fz) in the three axis directions outputted from the sensor data output unit 31, during the assembly work. The input data is to be time-series data inputted during a period of time in which the assembly work is being performed. When the assembly work is normally performed, the operator inputs, to the learning unit 41, the value (1, 0, 0) as a correct answer value of a work result, that is, output data. Specifically, the operator inputs the correct answer value of the output data to the learning apparatus 4 by operating an input means of a computer serving as the learning apparatus 4, such as a keyboard, a mouse, or a touch panel. The learning apparatus 4 provides the data received by the input means to the learning unit 41. The learning unit 41 learns, as teacher data, a set of input data corresponding to the first state and the value (1, 0, 0) that is the correct answer value of the output data, the input data being from among the stored input data.

The second state is a state in which misalignment of the robot 1 is caused and the assembly work fails. The operator intentionally causes the robot 1 to be misaligned so as to fail in assembly work before starting the assembly work in actual production. The learning unit 41 of the learning apparatus 4 beforehand stores, as input data, the forces (Fx, Fy, Fz) in the three axis directions outputted from the sensor data output unit 31 in the learning apparatus 4 while this assembly work intended to fail is being performed. When the operator has intentionally caused the robot 1 to be misaligned so as to fail in assembly work, the operator inputs the value (0, 1, 0) as a correct answer value of the output data to the learning unit 41. The learning unit 41 learns, as teacher data, a set of input data corresponding to the second state and the value (0, 1, 0) that is the correct answer value of the output data, the input data being from among the stored input data.

The third state is a state in which an assembly work fails due to a parts anomaly such as a partial defect in a component part or irregular adhesion of foreign matter to a component part. The operator intentionally causes a parts anomaly so as to fail in the assembly work before starting the assembly work in actual production. The learning unit 41 of the learning apparatus 4 beforehand stores, as input data, the forces (Fx, Fy, Fz) in the three axis directions outputted from the sensor data output unit 31 in the learning apparatus 4 while the assembly work intended to fail is being performed. When the operator has intentionally caused a parts anomaly so as to fail in the assembly work, the operator inputs the value (0, 0, 1) as a correct answer value of the output data to the learning unit 41. The learning unit 41 learns, as teacher data, a set of input data corresponding to the third state and the value (0, 0, 1) that is the correct answer value of the output data, the input data being from among the stored input data. Note that not only a parts anomaly but also misalignment may be caused in the third state, and the learning apparatus 4 may be caused to acquire sensor data corresponding to this period and perform learning in response to input of the value (0, 1, 1) that is the correct answer value of the output data, as a corresponding work result.

Note that when the learning unit 41 performs learning, the robot 1 is caused to perform an assembly work at two or more speeds, and data sets corresponding to the speeds are acquired for learning. In this case, learning may be performed for all speeds at which the robot 1 can operate. Alternatively, learning may be performed at selected some speeds representative of a range of all conceivable speeds, thereby making it possible to reduce time required for the learning as compared with the case where learning is performed for all the speeds. In addition, it is possible to further reduce the time required for learning by reducing the amount of data necessary for the learning while performing learning for a single speed such as a speed most likely to be used or the lowest speed in the range of conceivable speeds so as to collect data for the learning from an early stage of start-up adjustment.

Note that an example in which three elements such as (1, 0, 0) are outputted as output data in the machine learning is described in the present embodiment, but the number of elements of the output data is not limited to three. In addition, an example is described here in which the value (1, 0, 0) indicates that the assembly work has been performed normally, the value (0, 1, 0) indicates an anomaly of misalignment, and the value (0, 0, 1) indicates a parts anomaly. However, the specific values of the output data and definitions thereof are not limited to this example. In performing learning, a dimension may be increased so as to divide the states of anomalies in parts into two or more anomaly modes including a mode for a defect in parts and a mode for abnormal adhesion of foreign matter. In the present embodiment, sensor data that is time-series data of each state is supposed to be the input data to perform machine learning based on the RNN.

Figure 2:
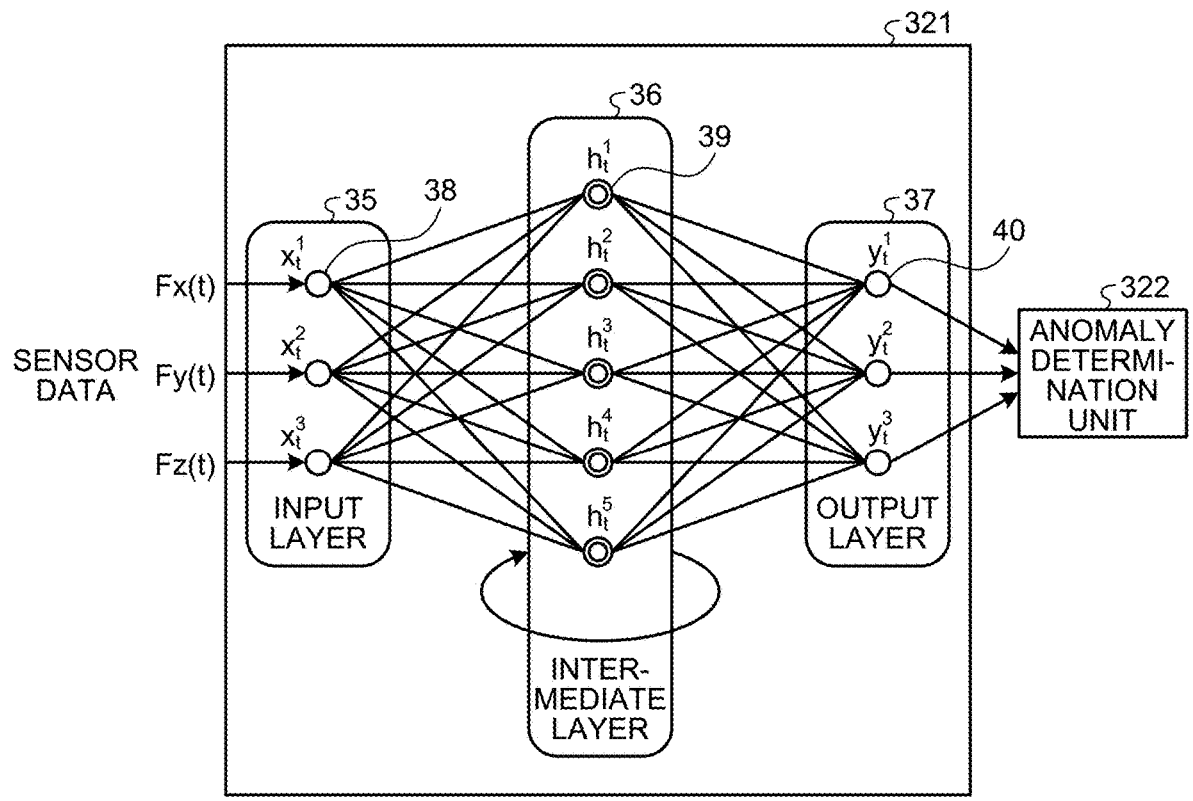
FIG. 2 is a diagram illustrating a configuration example of a determination unit according to the first embodiment.

Next, the determination unit 32 will be described in detail. FIG. 2 is a diagram illustrating a configuration example of the determination unit 32 according to the present embodiment. The determination unit 32 includes a model unit 321 and an anomaly determination unit 322. The model unit 321 generates data with use of the learned learning model having already experienced learning of the learning unit 41. The anomaly determination unit 322 determines the quality of the work with used of the data generated by the model unit 321, that is, output data of the learned learning model. Note that the learning unit 41 includes a model unit with the same configuration as the model unit 321 of FIG. 2, and has a function of evaluating an error in the output data obtained by the model unit and determining each weight in the model unit such that the error is made smaller. A model obtained such that the error is made smaller is supposed to be a learned learning model.

As illustrated in FIG. 2, the model unit 321 includes an input layer 35, an intermediate layer 36, and an output layer 37. The input layer 35 includes nodes 38. The number of the nodes 38 corresponds to the number of elements of input data, that is, the number of inputs. In FIG. 2, only the top node 38 is denoted by the reference numeral, but circles with no reference numeral in the input layer 35 also represent nodes 38.

The intermediate layer 36 includes a plurality of nodes 39. In FIG. 2, only the top node 39 is denoted by the reference numeral, but double circles with no reference numeral in the intermediate layer 36 also represent nodes 39. The output layer 37 includes nodes 40. The number of the nodes 40 corresponds to the number of elements of output data, that is, the number of outputs. In FIG. 2, only the top node 40 is denoted by the reference numeral, but circles with no reference numeral in the output layer 37 also represent nodes 40.

The input layer 35 outputs, to the intermediate layer 36, input data that is the sensor data outputted from the sensor data output unit 31, for each control period. Specifically, each node 38 outputs inputted data to each node 39 of the intermediate layer 36. Each node 38 may multiply an inputted value by a weight and then output the weighted value to each node 39 of the intermediate layer 36. Each node 39 of the intermediate layer 36 performs RNN processing, and outputs a processing result to each node 40 of the output layer 37. Each node 40 of the output layer 37 adds up the data outputted from the nodes 39 of the intermediate layer 36, and outputs a result of the addition. Each node 40 of the output layer 37 may multiply the data outputted from each node 39 of the intermediate layer 36 by a weight, and add up results of multiplying the data by the weights.

In FIG. 2, the intermediate layer 36 is illustrated as a single layer. However, two or more intermediate layer 36 may be used. Furthermore, the number of inputs is three and the number of outputs is three in FIG. 2, but the number of inputs and the number of outputs are not limited to this example. Moreover, in FIG. 2, the number of the nodes 39 in the intermediate layer 36 is five. However, the number of the nodes 39 in the intermediate layer 36 is not limited to five.

In FIG. 2, $x^1_t$, $x^2_t$, and $x^3_t$ denote three elements composing the input data at a time t. The symbol "t" denotes time discretized in units of control periods. That is, t is an integer numeral indicating where is a control period in the chronological order of the control periods. The symbols "$h^1_t$", "$h^2_t$", "$h^3_t$", "$h^4_t$", and "$h^5_t$" denote outputs of the nodes 39 of the intermediate layer 36 at the time t. The symbols "$y^1_t$", "$y^2_t$", and "$y^3_t$" denote outputs of the nodes 40 of the output layer 37 at the time t.

The present embodiment is based on the assumption of an RNN. Therefore, the intermediate layer 36 stores an output result of the intermediate layer 36 in the previous control period, and outputs, to the output layer 37, a weighted sum of the output result for the previous control period and a term calculated from a value inputted from the input layer 35 in the current control period. RNNs are often used to learn time-series data such as sensor outputs. In an RNN, when $x_t$ denotes a vector having input values (for example, $x^1_t$, $x^2_t$, and $x^3_t$) as elements thereof, and $h_t$ denotes a vector having output values of the intermediate layer 36 as elements thereof, the vector $h_t$ can be expressed by the following equation (1). As described above, t is an integer number indicating an ordinal position of the control periods. Let M be the dimension of the vector $x_t$, and N be the dimension of the vector $h_t$. Then, W denotes a linear transformation matrix of a dimension of N×M, R denotes a linear transformation matrix of a dimension of N×, and b denotes a bias vector. The symbol "g(·)" represents an activation function.

[Formula 1]

$$h_t = g(Wx_t + Rh_{t-1} + b) \quad (1)$$

Examples of an RNN include Elman/Jordan net, long short-term memory (LSTM), and a gated recurrent unit (GRU), any of which may be used to make a configuration for the RNN. As such, description is given for an example in the case of using the LSTM in the present embodiment.

Figure 3:
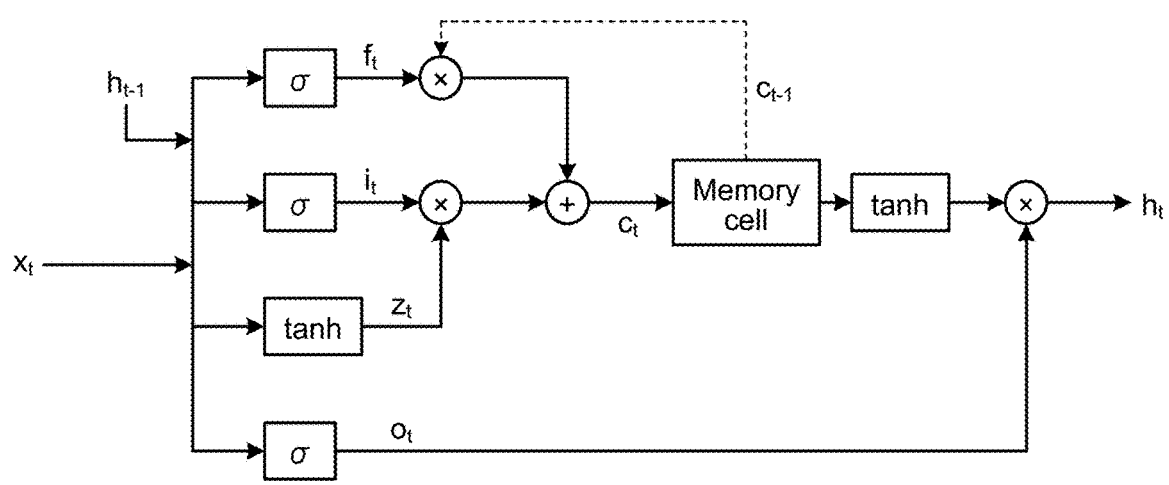
FIG. 3 is a diagram illustrating a configuration example of an intermediate layer of a model unit according to the first embodiment.

FIG. 3 is a diagram illustrating a configuration example of the intermediate layer 36 of the model unit 321 according to the present embodiment. As an example, FIG. 3 illustrates the case where a single node 39 is provided. In the configuration example illustrated in FIG. 3, calculations shown in equations (2) to (7) below are performed in the intermediate layer 36.

[Formula 2]

$$f_t = \sigma(W_f x_t + R_f h_{t-1} + b_f) \quad (2)$$

$$i_t = \sigma(W_i x_t + R_i h_{t-1} + b_i) \quad (3)$$

$$z_t = \tanh(W_z x_t + R_z h_{t-1} + b_z) \quad (4)$$

$$o_t = \sigma(W_o x_t + R_o h_{t-1} + b_o) \quad (5)$$

$$c_t = c_{t-1} \otimes f_t + i_t \otimes z_t \quad (6)$$

$$h_t = o_t \otimes \tanh(c_t) \quad (7)$$

$$W_f, W_i, W_z, W_o \in R(dim(h_t) \times dim(x_t))$$

$$R_f, R_i, R_z, R_o \in R(dim(h_t) \times dim(h_t))$$

Here, $W_f$, $W_i$, $W_z$, and $W_o$ denote linear transformation matrices of dimensions of N×M, $R_f$, $R_i$, $R_z$, and $R_o$ denote linear transformation matrices of dimensions of N×N, and $b_f$, $b_i$, $b_z$, and $b_o$ denote bias vectors. These are determined by learning of the learning unit 41. The symbol "$\sigma(\cdot)$" denotes a sigmoid function, and the symbol "$\tanh(\cdot)$" denotes a hyperbolic tangent function.

Note that since commonly used RNN processing can be applied to each processing in the model unit 321, detailed description thereof will be omitted.

$y^1_t$, $y^2_t$, and $y^3_t$ outputted from the nodes 40 of the output layer 37 are inputted to the anomaly determination unit 322 as output data of the model unit 321. The present embodiment is based on the premise that $y^1_t$, $y^2_t$, and $y^3_t$ are the following values. "$y^1_t$" serving as the first element indicates that as its value is closer to 1, the work is more likely to be normal. "$y^2_t$" serving as the second element indicates that as its value is closer to 1, the work is more likely to suffer an anomaly of misalignment of the robot 1. "$y^3_t$" serving as the third element indicates that as its value is closer to 1, the work is more likely to suffer a parts anomaly such as a partial defect in a component part or adhesion of foreign matter to a component part. The anomaly determination unit 322 determines the quality of the work of the robot 1 for each control period on the basis of the output data of the model unit 321.

When the robot 1 starts assembly work such as cover assembly, connector insertion, board insertion, and shaft fitting for production, the control apparatus 3 according to the present embodiment causes the determination unit 32 to start the determination, and when the robot 1 finishes the above-described assembly work, the control apparatus 3 causes the determination unit 32 to end the determination.

As described above, the correct answer value of the output data is represented as an integer value such as (1, 0, 0) in the teacher data. However, each value in the output data of the model unit 321 is not limited to an integer value. Therefore, the quality of work is determined by comparison of each value with a specified value. When the second element reaches or exceeds the specified value even just once in each control period from the start to the end of the assembly work, the anomaly determination unit 322 determines that an anomaly of misalignment has occurred, and outputs, as a determination result, a value indicating the anomaly of misalignment to the motion correction unit 33. In addition, when the third element reaches or exceeds the specified value even just once in each control period from the start to the end of the assembly work, the anomaly determination unit 322 determines that a parts anomaly has occurred, and outputs, as a determination result, a value indicating the parts anomaly to the motion correction unit 33. Furthermore, the anomaly determination unit 322 may be configured to determine that a parts anomaly has occurred, and to output, as a determination result, a value indicating the parts anomaly to the motion correction unit 33 when the second element reaches or exceeds the specified value even just once and the third element reaches or exceeds the specified value even just once in each control period from the start to the end of the assembly work.

Moreover, when the first element is equal to or greater than the specified value and both the second element and the third element are less than the specified value in all the control periods from the start to the end of the assembly work, the anomaly determination unit 322 outputs, as a determination result, a value indicating normality to the motion correction unit 33. Alternatively, the anomaly determination unit 322 may be configured to output, as a determination result, a value indicating normality to the motion correction unit 33 when each of the second element and the third element is less than the specified value in all the control periods from the start to the end of the assembly work. Different values may be used as specified values for comparison with the first element, the second element, and the third element. Alternatively, the same value may be used as a specified value for comparison with each of the first element, the second element, and the third element. Furthermore, determination is made based on whether or not each value is equal to or greater than the specified value in the above example, but the determination may be made based on whether or not each value exceeds the specified value.

Next, hardware configurations of the learning apparatus 4 and the control apparatus 3 according to the present embodiment will be described. The sensor data output unit 31, the determination unit 32, the motion correction unit 33, and the motion control unit 34 of the control apparatus 3 are implemented by a processing circuit. The processing circuit may be a circuit including a processor, or may be based on dedicated hardware.

Figure 4:
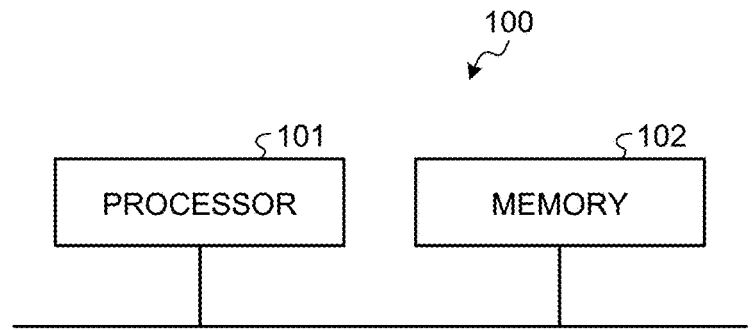
FIG. 4 is a diagram illustrating a configuration example of a processing circuit according to the first embodiment.

When the processing circuit is a circuit including a processor, the processing circuit is, for example, a processing circuit having a configuration illustrated in FIG. 4. FIG. 4 is a diagram illustrating a configuration example of the processing circuit according to the present embodiment. A processing circuit 100 illustrated in FIG. 4 includes a processor 101 and a memory 102. When the sensor data output unit 31, the determination unit 32, the motion correction unit 33, and the motion control unit 34 are implemented by the processing circuit 100 illustrated in FIG. 4, the processor 101 reads and executes a program stored in the memory 102 to implement these units. That is, when the sensor data output unit 31, the determination unit 32, the motion correction unit 33, and the motion control unit 34 are implemented by the processing circuit 100 illustrated in FIG. 4, their functions are implemented by use of a program that is software. The memory 102 is also used as a work area for the processor 101. The processor 101 corresponds to a central processing unit (CPU) or the like. The memory 102 corresponds to, for example, a nonvolatile or volatile semiconductor memory such as a random access memory (RAM), a read only memory (ROM), or a flash memory, a magnetic disk, or the like.

When the sensor data output unit 31, the determination unit 32, the motion correction unit 33, and the motion control unit 34 are based on dedicated hardware, the processing circuit is, for example, a field-programmable gate array (FPGA) or an application specific integrated circuit (ASIC). Note that the sensor data output unit 31 may be implemented by a combination of a processing circuit including a processor and a dedicated hardware set. The sensor data output unit 31, the determination unit 32, the motion correction unit 33, and the motion control unit 34 may be implemented by two or more processing circuits.

The learning apparatus 4 is a computer as described above. The learning unit 41 of the learning apparatus 4 is implemented by a processing circuit in the computer. This processing circuit is configured in the same manner as the processing circuit 100 illustrated in FIG. 4. The learning apparatus 4 is implemented by the processor 101 reading and executing the program stored in the memory 102. The memory 102 is also used as a work area for the processor 101. Furthermore, the computer that implements the learning apparatus 4 includes the input means such as the keyboard, the mouse, or the touch panel as described above, and also includes display means such as a display module or a monitor. The operator who uses the learning apparatus 4 can input a work result using the input means as described above with the assistance of a display screen displayed on the display means.

The learning apparatus 4 and the control apparatus 3 may each have a communication circuit so as to perform data transmission and reception between the learning apparatus 4 and the control apparatus 3. In this case, data transmission and reception between the learning apparatus 4 and the control apparatus 3 is performed via their respective communication circuits.

In the above-described example, the number of inputs is three and the number of outputs is three in the model unit 321, but the number of inputs and the number of outputs are not limited to the above-described example. For example, a case where the number of inputs is six and the number of outputs is two can be adopted as shown below. In addition to the forces in the three axis directions, the respective moments (Mx, My, Mz) around the three axes are also used as input data. Prior to the start of work of the robot 1, the operator beforehand causes the learning apparatus 4 to acquire the respective moments (Mx, My, Mz) around the three axes in addition to the forces in the three axis directions for both of a normal state and anomalous states such as misalignment and parts anomaly, and to make learning with the moments and the forces in association with a work result that is the output data of a correct answer. For example, when the work of the robot 1 is normal, the output data is set as (1, 0), and when the work is anomalous, the output data is set as (0, 1), so as to make learning. In an assembly work performed by the robot 1 after the start of production, the anomaly determination unit 322 determines the quality of the work based on output data composed of two elements, that is, the first element and the second element.

Specifically, when the second element is equal to or greater than the specified value, the anomaly determination unit 322 outputs, as a determination result, a value indicating occurrence of an anomaly to the motion correction unit 33. When the second element is less than the specified value, the anomaly determination unit 322 outputs, as a determination result, a value indicating normality to the motion correction unit 33. When the value indicating normality is inputted as a determination result, the motion correction unit 33 does nothing without any change. Furthermore, when a value indicating an anomaly is inputted as a determination result, the motion correction unit 33 outputs, to the motion control unit 34, a motion command to temporarily stop the robot 1, return the robot 1 to a predetermined position, and stop the robot 1 again, and causes the display unit 5 to display that an anomaly has occurred.

Furthermore, the sensor 2 may include a force sensor and a position detector that detects the position of a motor on each axis of the robot 1. In this case, the sensor data output unit 31 outputs, to the determination unit 32, the forces (Fx, Fy, Fz) in the three axis directions, the moments (Mx, My, Mz) around the three axes, and the position of each motor on six axes, as sensor data. Therefore, the number of inputs in the model unit 321 is 12. Furthermore, a current detector that detects motor current may also be added as the sensor 2, and the sensor data output unit 31 may also output the motor current as sensor data to the determination unit 32. In addition, a motor position command may be inputted to the determination unit 32. The contents and the number of items of the sensor data are not limited to the above-described example as long as the sensor data represents the state of the robot 1, the state of the work of the robot 1, and the state of surroundings of the robot 1.

In addition, the number of outputs is equal to or greater than four in the case of determining three or more types of anomalies as causes of an anomaly in the number of outputs. Note that when the number of outputs is different from the above-described example, the learning apparatus 4 is used to perform learning accordingly. For example, when determining anomalies of three or more types, the learning apparatus 4 performs learning using teacher data according to a type of each anomaly before the assembly work is started in actual production.

In the control apparatus 3 according to the present embodiment, the determination unit 32 performs determination for each control period as described above. Therefore, it is possible to minimize a time lag from the anomalous occurrence to the determination thereof as compared with the conventional technique of determining an anomaly in work by storing and using a certain time period worth of data to calculate feature quantities. Moreover, in the present embodiment, since two or more anomaly modes are determined by use of a single recurrent neural network, it is possible to minimize a processing load at the time of determining the quality of work as compared with the conventional technique of determining the quality of work by calculating a plurality of feature quantities. Furthermore, in the present embodiment, since it is not necessary to set a duration of time for determination, determination can be performed by one and the same determination unit regardless of a speed of the work. Therefore, it is not necessary to perform relearning with changing the speed of the work. As described above, the control apparatus 3 according to the present embodiment can minimize a time lag between the occurrence and determination of an anomaly in work at the time of determining the quality of the work, and can reduce a processing load at the time of determining the quality of the work, thereby making it unnecessary to perform relearning with changing the speed of the work.

Second Embodiment

Figure 5:
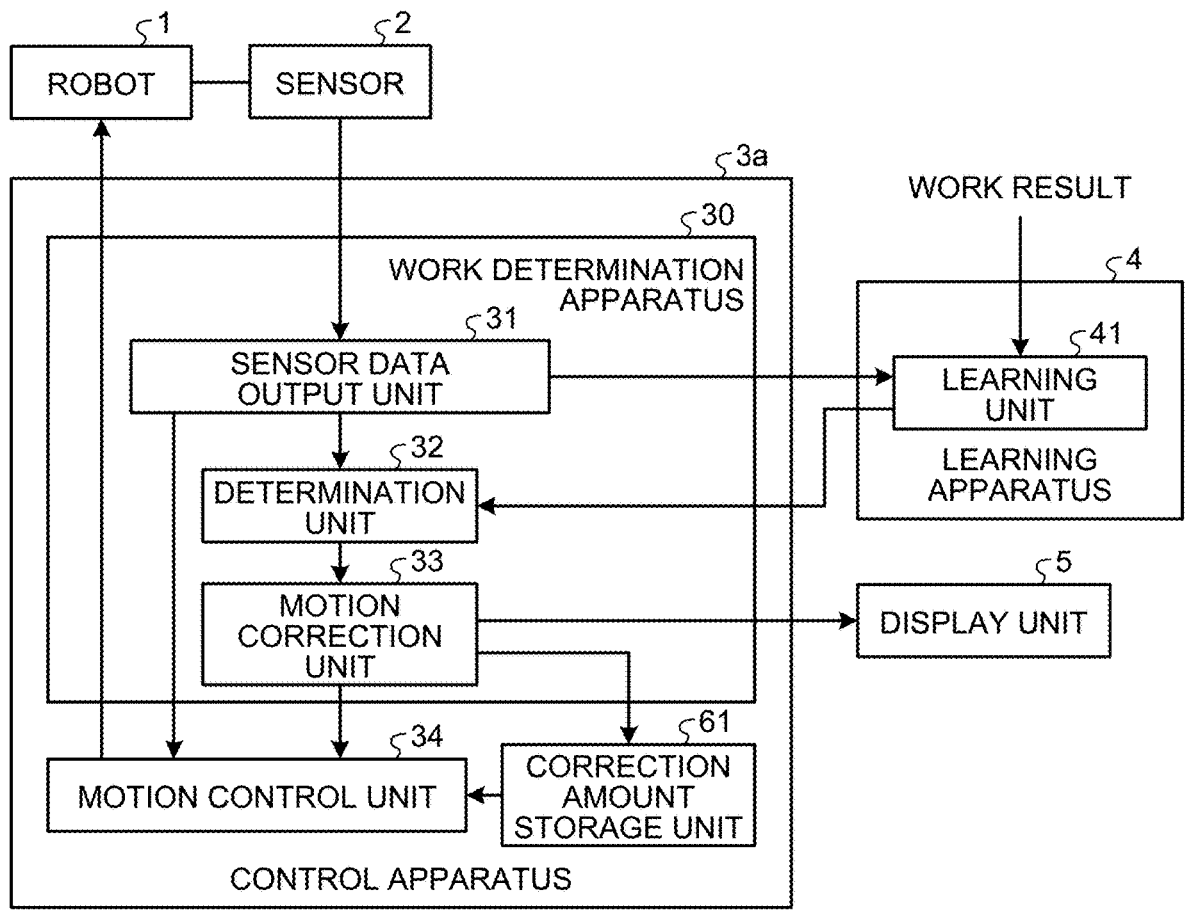
FIG. 5 is a diagram illustrating a configuration example of a mechanical system according to a second embodiment.

Next, a work determination method according to a second embodiment of the present invention will be described. FIG. 5 is a diagram illustrating a configuration example of a mechanical system of the second embodiment. As illustrated in FIG. 5, the mechanical system of the present embodiment is the same as the mechanical system of the first embodiment except that the mechanical system of the present embodiment includes a control apparatus 3a in place of the control apparatus 3 of the first embodiment. A correction amount storage unit 61 is added to the control apparatus 3 of the first embodiment to configure the control apparatus 3a. The same constituent elements as those in the first embodiment will be described with the same reference symbols, and description overlapping with the first embodiment will be omitted. Hereinafter, a difference from the first embodiment will be mainly described.

In the first embodiment, each element included in the output data of the model unit 321, that is, the output data of the RNN corresponds to a flag indicating whether a condition indicated by each element is met, such as whether the work is normal. In the present embodiment, an example will be described in which the output data includes not only a value corresponding to the flag but also a value that quantitatively indicates some item.

Before the robot 1 starts an assembly work in the actual production, the learning unit 41 performs machine learning with use of teacher data corresponding to each of states including at least a first state, a second state, and a third state to be described below. That is, the first state corresponds to a case in which the assembly work has been normally completed with no misalignment. The second state corresponds to a case in which the assembly work has failed due to some misalignment or the assembly work has been successful in spite of some misalignment. The third state corresponds to a case in which the work has failed due to a parts anomaly such as a partial defect in a component part or irregular adhesion of foreign matter to a component part.

An operator inputs (1, 0, 0, 0, 0), to the learning apparatus 4, as a work result corresponding to the first state. The learning apparatus 4 performs learning with associating sensor data with the work result corresponding to the first state. The present embodiment is based on the assumption that the sensor data is time-series data on the forces (Fx, Fy, Fz) in three axis directions and the moments (Mx, My, Mz) around the three axes.

In addition, the operator intentionally causes a misalignment to thereby cause the second state. As a work result corresponding to the second state, the operator inputs (0, $r_1$, $r_2$, $r_3$, 0) to the learning apparatus 4 when the assembly work has failed, and inputs (1, $r_1$, $r_2$, $r_3$, 0) to the learning apparatus 4 when the assembly work has been successful. The symbols "$r_1$", "$r_2$", and "$r_3$" denote the ratios of actual misalignment amounts to allowable values in misalignment amount regarding a position in an x-axis direction, a position in a y-axis direction, and a rotation θ around a z-axis that is a vertical axis, respectively. The symbols "$r_1$", "$r_2$", and "$r_3$" are examples of values representing the amounts of misalignment. Note that, here, it is assumed that the x-axis and the y-axis are two axes extending in a horizontal direction, and the z-axis extends in a vertical axis direction. For example, let $\Delta x_{max}$ be an allowable value in misalignment amount regarding the position of the robot 1 in the x-axis direction. The operator measures the actual misalignment amount of the robot 1 in the x-axis direction. Let $\Delta x_r$ be the result of measurement performed by the operator. At this time, the operator calculates $r_1$ from $r_1 = Lx_r/\Delta x_{max}$. Note that $r_1$ is a value including a plus sign and minus sign. For example, the actual misalignment amount is to be measured as a value including a plus sign or minus sign, and the allowable value in misalignment amount is an absolute value. Similarly, the operator calculates $r_2$ and $r_3$, and inputs a work result based on the obtained calculation results to the learning apparatus 4. The learning apparatus 4 performs learning with associating sensor data corresponding to the second state with the work result. At this time, the operator may change the amount of misalignment to be caused and input a work result according to the changed misalignment amount so as to cause the learning apparatus 4 to perform learning of a plurality of cases of different amounts of misalignment.

In addition, the operator intentionally causes a parts anomaly to cause the third state. Furthermore, as a work result corresponding to the third state, the operator inputs (0, $r_1$, $r_2$, $r_3$, 1) to the learning apparatus 4. In the third state, there may be misalignment, or there may be no misalignment. When there is no misalignment, $r_1$, $r_2$, and $r_3$ are 0, 0, and 0, respectively. The learning apparatus 4 performs learning with associating sensor data corresponding to the third state with the work result.

When the above-described learning is performed, the learning apparatus 4 generates a learned learning model, and this learning model is used in the model unit 321 of the determination unit 32. Then, as in the first embodiment, the determination unit 32 starts determination when the robot 1 starts an assembly work such as cover assembly, connector insertion, board insertion, and shaft fitting for production.

In the present embodiment, the number of inputs to the model unit 321 is six, and the number of outputs from the model unit 321 is five. The model unit 321 inputs, to the anomaly determination unit 322, output data composed of five elements that are a first element to a fifth element. When the fifth element reaches or exceeds a specified value even just once in any control period from the start to the end of the assembly work, the anomaly determination unit 322 determines that a parts anomaly has occurred, and outputs, as a determination result, a value indicating the parts anomaly to the motion correction unit 33.

In addition, when one or more of the second element, the third element, and the fourth element reach or exceed the specified value even just once in any control period from the start to the end of the assembly work, the anomaly determination unit 322 determines that an anomaly of misalignment has occurred, and outputs, as a determination result, a value indicating the anomaly of misalignment to the motion correction unit 33. At this time, when the second element, the third element, and the fourth element are all less than the specified value in all the control periods from the start to the end of the assembly work, the anomaly determination unit 322 outputs not only a value indicating a normality as a determination result, but also $r_1$, $r_2$, and $r_3$ to the motion correction unit 33. The respective specified values used for comparison with the first element to the fifth element may be different from each other or may be equal to each other.

Furthermore, when the first element is equal to or greater than the specified value and the second element, the third element, the fourth element, and the fifth element are zero in all the control periods from the start to the end of the assembly work, the anomaly determination unit 322 determines that the assembly work has been normally performed with no misalignment, and outputs, as a determination result, a value indicating a normality to the motion correction unit 33.

When a value indicating a parts anomaly is inputted as a determination result, the motion correction unit 33 generates and outputs, to the motion control unit 34, a motion correction command to temporarily stop the robot 1, return the robot 1 to a predetermined position, and stop the robot 1 again, and the motion correction unit 33 causes the display unit 5 to display information on an anomaly. When a value indicating an anomaly of misalignment is inputted as a determination result, the motion correction unit 33 generates and outputs, to the motion control unit 34, a motion correction command to temporarily stop the robot 1, return the robot 1 to the predetermined position, and correct the misalignment of the robot 1 according to the values of $r_1$, $r_2$, and $r_3$. That is, the motion correction unit 33 corrects the motion of an industrial machine with use of the values of $r_1$, $r_2$, and $r_3$ in such a way as to prevent misalignment, and performs control so as to cause the industrial machine to perform an accordingly suitable work again. As a result, the assembly work is carried out again based on the motion correction command having been subjected to correction of misalignment.

Furthermore, when $r_1$, $r_2$, and $r_3$ have been inputted under a condition where information on normality has been inputted as a determination result, the motion correction unit 33 ends the work without doing anything with no change. In this situation, the motion correction unit 33 stores the values of $r_1$, $r_2$, and $r_3$ in the correction amount storage unit 61 until the start of the next work, thereafter reads $r_1$, $r_2$, and $r_3$ from the correction amount storage unit 61 at the start of the next work, generates a motion command to correct misalignment of the robot 1 according to the values of $r_1$, $r_2$, and $r_3$, and outputs the motion command to the motion control unit 34. That is, when a value indicating the amount of misalignment is less than a specified value, the motion correction unit 33 does not correct the motion of the robot 1 in the current work, and performs control to correct the motion of the robot 1 using the value representing the amount of misalignment in the next work of the robot 1 so that the misalignment is prevented. As a result, in the next and subsequent works, the assembly work is carried out based on the motion correction command having been subjected to correction of the misalignment, so that it is possible to prevent stoppage of the robot 1 caused by accumulation of misalignment. The operations in the present embodiment other than those described above are the same as those in the first embodiment. Note that the correction amount storage unit 61 is implemented by a memory.

As described above, in the present embodiment, the anomaly determination unit 322 is configured to output, to the motion correction unit 33, the output data including a value quantitatively representing misalignment of the robot 1 when it is determined that misalignment has occurred. As a result, the control apparatus 3a according to the present embodiment has the same advantageous effect as that of the first embodiment, and also can cause the robot 1 to continue the work by causing the robot 1 to operate in such a way as to compensate for the amount of misalignment of the robot 1 when the misalignment occurs. In addition, correction of the next and subsequent commands achieves some advantageous effect of preventing the occurrence of misalignment during work.

Third Embodiment

Figure 6:
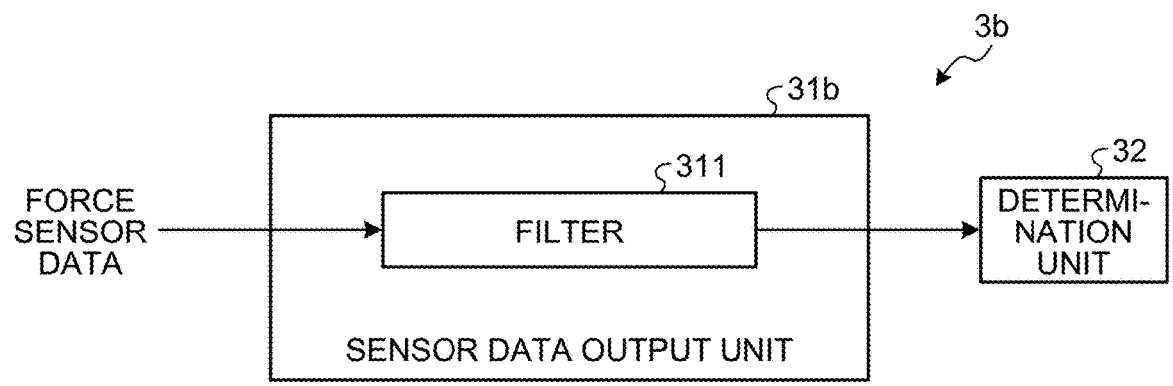
FIG. 6 is a diagram illustrating a configuration example of a sensor data output unit according to a third embodiment.

FIG. 6 is a diagram illustrating a configuration example of a sensor data output unit according to a third embodiment of the present invention. A sensor data output unit 31b according to the third embodiment includes a filter 311. The filter 311 is configured by any of a high-pass filter, a band-pass filter, and a low-pass filter. A control apparatus 3b according to the present invention is the same as the control apparatus 3 according to the first embodiment except that the control apparatus 3b includes the sensor data output unit 31b in place of the sensor data output unit 31. A mechanical system according to the present embodiment is the same as the mechanical system according to the first embodiment except that the mechanical system according to the present embodiment includes the control apparatus 3b in place of the control apparatus 3. Hereinafter, some points different from the first embodiment will be described, and description overlapping with the first embodiment will be omitted.

As with the sensor data output unit 31 according to the first embodiment, sensor data outputted from the sensor 2 is inputted to the sensor data output unit 31b. This example is based on the premise that the sensor 2 is a force sensor and that the sensor data is force sensor data composed of the forces (Fx, Fy, Fz) in the three axis directions of the robot 1 and the moments (Mx, My, Mz) around the three axes.

The filter 311 of the sensor data output unit 31b extracts a component in a desired frequency band from the force sensor data, and outputs, as state data, the result of extraction to the determination unit 32. Thus, the influence of noise and the like can be reduced by such extraction of the component in the desired frequency band from the sensor data, and accordingly the accuracy of determining the work quality can be improved. Furthermore, when a frequency band in which the sensor data varies due to the work is known, the accuracy of determining the quality of the work can be improved by extraction of the frequency band with the filter 311. Note that the sensor data output unit 31b is implemented by a processing circuit as with the sensor data output unit 31. The operations in the present embodiment other than those described above are the same as those in the first embodiment. Furthermore, the sensor data output unit 31b according to the present embodiment may be applied to the mechanical system according to the second embodiment.

Fourth Embodiment

Next, a work determination method according to a fourth embodiment of the present invention will be described. The configuration of a mechanical system according to the fourth embodiment and the configuration of each apparatus included in the mechanical system are the same as those of the first embodiment. The same constituent elements as those in the first embodiment will be described with the same reference symbols, and description overlapping with the first embodiment will be omitted. Hereinafter, a point different from the first embodiment will be mainly described.

In the first embodiment, the determination unit 32 performs a determination operation with a period equal to the regular control period in the motion control unit 34. In contrast, in the present embodiment, an interval between outputs from the sensor data output unit 31, that is, the period with which the determination unit 32 performs determination operation is set to an integral multiple of the regular control period in the motion control unit 34. In the present embodiment, the interval between outputs from the sensor data output unit 31 is L times the control period, where L is an integer equal to or greater than 2. Then, the sensor data output unit 31 outputs, as state data, an average value of the latest L pieces of sensor data.

For example, the period with which the determination unit 32 performs a determination operation is set to four times the regular control period in the motion control unit 34. In this case, the sensor data output unit 31 uses the most recent four sampling periods worth of sensor data to calculate the average value of the four sampling periods worth of data separately for each of the data pieces such as the forces (Fx, Fy, Fz) in the three axis directions.

In this way, the influence of noise and the like can be reduced by use of the average value of multiple sampling periods worth of sensor data. Note that in the present embodiment, a time interval between a time point at which an anomaly occurs and a time point at which it is determined that the anomaly has occurred may be longer than that in the first embodiment, but setting the period with which the determination unit 32 performs a determination operation to be shorter than a certain time period used for the conventional feature quantity calculation enables to reduce, as compared with the conventional art, the time interval between the time point at which an anomaly occurs and the time point at which it is determined that the anomaly has occurred. The operations in the present embodiment other than those described above are the same as those in the first embodiment. Furthermore, any operation in the present embodiment may be applied to the mechanical system according to the second embodiment or the third embodiment.

Fifth Embodiment

Figure 7:
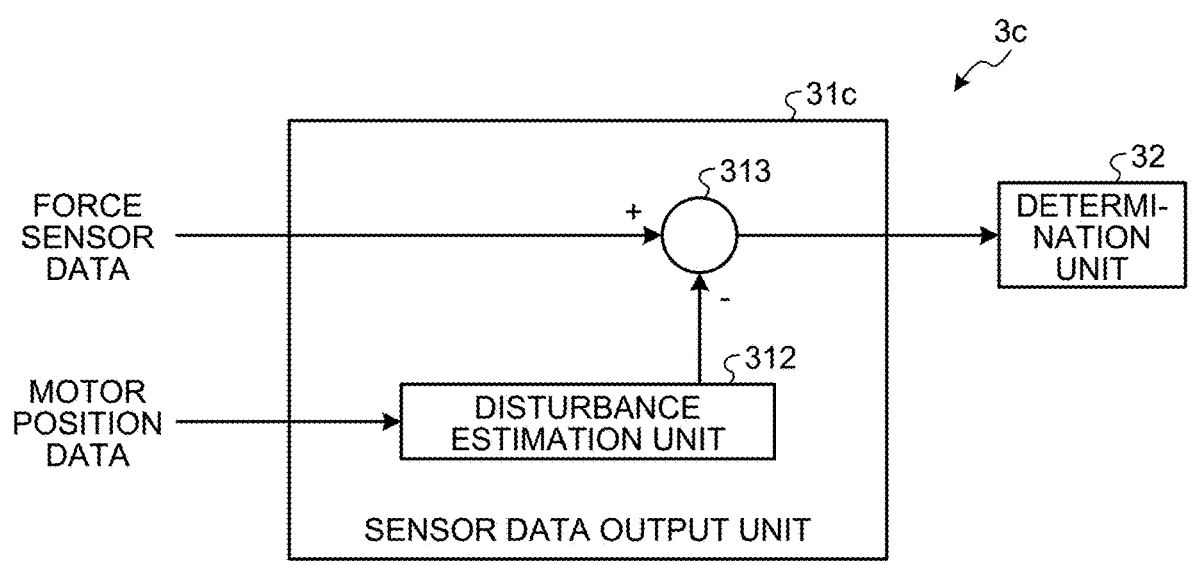
FIG. 7 is a diagram illustrating a configuration example of a sensor data output unit according to a fifth embodiment.

FIG. 7 is a diagram illustrating a configuration example of a sensor data output unit according to a fifth embodiment of the present invention. A sensor data output unit 31c according to the fifth embodiment includes a disturbance estimation unit 312 and a subtraction unit 313. A control apparatus 3c according to the present invention is the same as the control apparatus 3 according to the first embodiment except that the control apparatus 3c includes the sensor data output unit 31c in place of the sensor data output unit 31. A mechanical system according to the present embodiment is the same as the mechanical system according to the first embodiment except that the mechanical system according to the present embodiment includes the control apparatus 3c in place of the control apparatus 3. Hereinafter, points different from the first embodiment will be described, and description overlapping with the first embodiment will be omitted.

In the fifth embodiment, the sensor 2 includes not only a force sensor but also a position detector that detects the position of a motor corresponding to each axis of the robot 1. The position detector outputs motor position data representing the position of the motor on each axis of the robot 1. Force sensor data and the motor position data are inputted to the sensor data output unit 31c.

The disturbance estimation unit 312 calculates a force of gravity acting on the force sensor using the motor position data, and estimates a disturbance component caused by the force of gravity, shown in a value measured by the force sensor, based on the calculated force of gravity. Then, the disturbance estimation unit 312 outputs an estimation result to the subtraction unit 313. The subtraction unit 313 subtracts, from the force sensor data, the estimation result outputted from the disturbance estimation unit 312, and outputs a subtraction result to the determination unit 32. By so doing, in the present embodiment, the sensor data output unit 31c removes the disturbance component caused by the force of gravity from the force sensor data, and so it is possible to determine the quality of the work with use of variation in the force sensor data caused by the work. Therefore, it is possible to improve the accuracy of determining the quality of the work. Note that the sensor data output unit 31c is implemented by a processing circuit as with the sensor data output unit 31. The operations in the present embodiment other than those described above are the same as those in the first embodiment.

Furthermore, the configuration and operation of the present embodiment may be applied to the mechanical system according to the second embodiment or the fourth embodiment. Furthermore, the present embodiment may be combined with the third embodiment so that data outputted from the subtraction unit 313 is extracted by a filter.

Note that in the above example, the disturbance estimation unit 312 estimates the disturbance component due to the force of gravity, but the disturbance estimation unit 312 may estimate not only such a disturbance component but also inertial force, centrifugal force, Coriolis force, and the like. For example, the disturbance estimation unit 312 calculates the motor speed and motor acceleration of each axis with use of the motor position data for each axis of the robot 1. Next, the disturbance estimation unit 312 estimates a disturbance component shown in a value measured by the force sensor, based on the sum of an inertial force, a centrifugal force, a Coriolis force, and a force of gravity which act on the force sensor, using the position, speed, and acceleration of the motor on each axis of the robot 1, and then outputs an estimation result to the subtraction unit 313.

Sixth Embodiment

Figure 8:
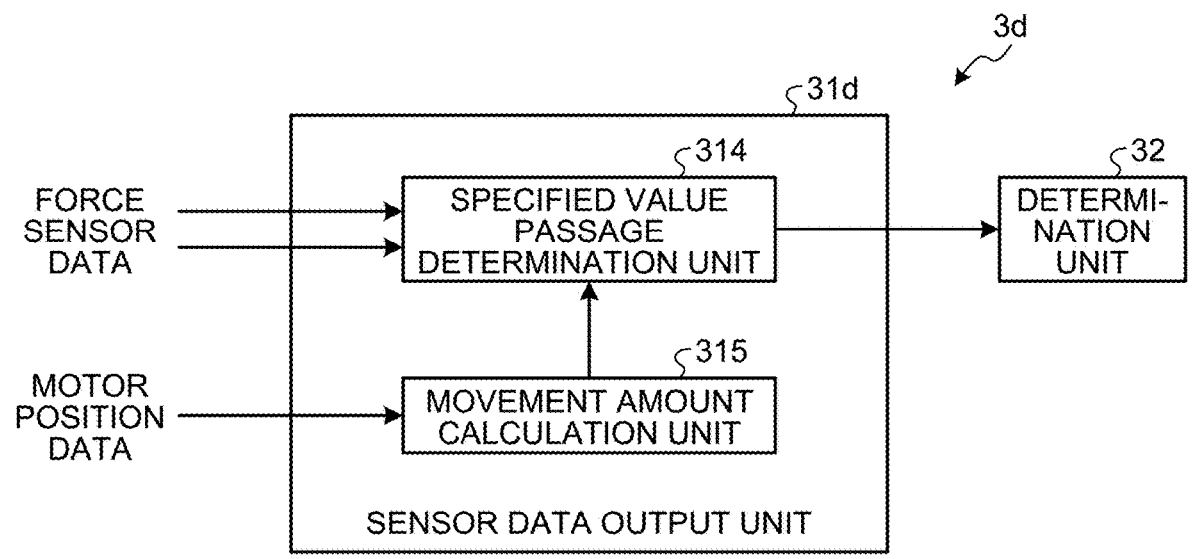
FIG. 8 is a diagram illustrating a configuration example of a sensor data output unit according to a sixth embodiment.

FIG. 8 is a diagram illustrating a configuration example of a sensor data output unit according to a sixth embodiment of the present invention. A sensor data output unit 31d according to the sixth embodiment includes a specified value passage determination unit 314 and a movement amount calculation unit 315. A control apparatus 3d according to the present invention is the same as the control apparatus 3 according to the first embodiment except that the control apparatus 3d includes the sensor data output unit 31d in place of the sensor data output unit 31. However, the determination unit 32 according to the present embodiment performs determination at a timing different from that in the first embodiment. A mechanical system according to the present embodiment is the same as the mechanical system according to the first embodiment except that the mechanical system according to the present embodiment includes the control apparatus 3d in place of the control apparatus 3. Hereinafter, a point different from the first embodiment will be described, and description overlapping with the first embodiment will be omitted.

In the present embodiment, an interval between outputs from the sensor data output unit 31d is determined such that the amount of movement of the robot 1 is constant for each output interval. Motor position data is inputted from a position detector to the movement amount calculation unit 315 for each control period. The position detector detects a motor position that is a position of the motor on each axis of the robot 1. The motor position data corresponds to the result of detection of the motor position. The movement amount calculation unit 315 calculates the position of a fingertip of the robot 1 based on the motor position data for each control period, and calculates the amount of movement of the position of the fingertip made after the start of the work. The movement amount calculation unit 315 outputs the calculated movement amount to the specified value passage determination unit 314.

Force sensor data is inputted to the specified value passage determination unit 314 for each control period. Furthermore, as described above, the movement amount calculated by the movement amount calculation unit 315 is inputted to the specified value passage determination unit 314 for each control period. When the movement amount inputted from the movement amount calculation unit 315 is less than a specified value, the specified value passage determination unit 314 does not output, to the determination unit 32, force sensor data for the control period concerned. When the movement amount calculated by the movement amount calculation unit 315 reaches or exceeds the specified value, the specified value passage determination unit 314 outputs, to the determination unit 32, the force sensor data for the control period concerned. After that, the specified value passage determination unit 314 does not output, to the determination unit 32, the force sensor data for the control period concerned when the inputted movement amount is less than "specified value×2", but the specified value passage determination unit 314 outputs, to the determination unit 32, the force sensor data for the control period concerned when the inputted movement amount reaches or exceeds "specified value×2". Thereafter, each time the specified value passage determination unit 314 outputs the force sensor data to the determination unit 32, the specified value passage determination unit 314 performs the same operation while an integer by which the specified value is to be multiplied is incremented by 1. When the force sensor data is inputted, the determination unit 32 determines the quality of the work as described in the first embodiment.

That is, the specified value passage determination unit 314 does not output, to the determination unit 32, the force sensor data for the control period concerned when the inputted movement amount is less than "specified value×k", but the specified value passage determination unit 314 outputs, to the determination unit 32, the force sensor data for the control period concerned when the inputted movement amount reaches or exceeds "specified value×k". The initial value of k is 0. The specified value passage determination unit 314 increments the value of k by 1 each time the specified value passage determination unit 314 outputs the force sensor data to the determination unit 32. That is, the sensor data output unit 31d determines an output interval based on the motor position data such that the amount of movement of the robot 1 is constant for each output interval. Based on such an operation performed, the force sensor data is outputted to the determination unit 32 each time the fingertip of the robot 1 moves by an amount for the specified value, and accordingly the determination unit 32 performs determination. Note that the sensor data output unit 31d is implemented by a processing circuit as with the sensor data output unit 31. The operations in the present embodiment other than those described above are the same as those in the first embodiment.

In the case where there is some phenomenon that occurs depending on a movement amount during the work of the robot 1, the force sensor data is inputted to the determination unit 32 at output intervals corresponding to the movement amount in the present embodiment. Therefore, that phenomenon appears in the same portion of the input time-series data regardless of a work speed, thereby leading to an advantageous effect of maintaining high accuracy in determination even if the work speed is changed after learning.

Note that since the movement amount calculated for each control period is not always an integral multiple of the specified value, the time when the movement amount reaches "specified value×k" does not necessarily match the output time of each sensor in the control period at which the force sensor data is outputted to the determination unit 32. Therefore, when the movement amount reaches "specified value×k", the robot 1 may be in a state different from a state indicated by the force sensor data outputted to the determination unit 32. For this reason, instead of outputting the force sensor data as it is, the specified value passage determination unit 314 may estimate force sensor data corresponding to the time when the movement amount reaches the value of "specified value×k" with use of force sensor data in the control period concerned and force sensor data in the previous control period, and output an estimation result to the determination unit 32. For example, the specified value passage determination unit 314 holds the inputted force sensor data and movement amount at least until the next control period. When a movement amount $d_t$ inputted in a t-th control period is equal to or greater than the value of "specified value×k" and a movement amount $d_{t-1}$ inputted in a (t-1)-th control period is less than the value of "specified value×k", the specified value passage determination unit 314 calculates a ratio of ($d_t$-specified value×k) to (specified value×k-$d_{t-1}$). Then, the specified value passage determination unit 314 may calculate the weighted sum of the force sensor data inputted in the (t-1)-th control period and the force sensor data inputted in the t-th control period in accordance with the calculated ratio, and output the weighted sum having been so calculated to the determination unit 32.

Furthermore, the configuration and operation in the present embodiment may be applied to the mechanical system according to the second embodiment or the fourth embodiment. Furthermore, the third embodiment and the present embodiment may be combined so that, for example, data outputted from the specified value passage determination unit 314 is passed through the filter 311 and inputted to the determination unit 32.

Seventh Embodiment

Figure 9:
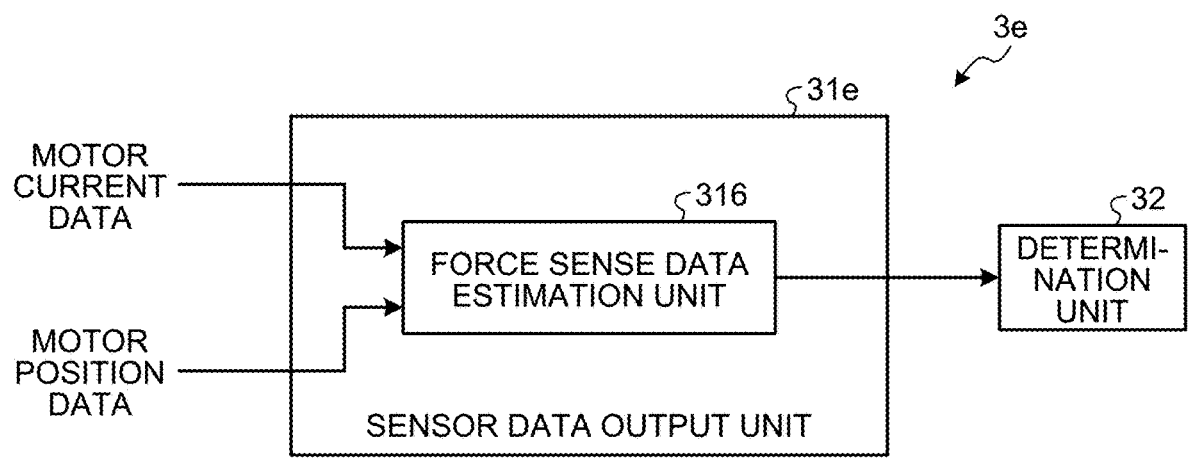
FIG. 9 is a diagram illustrating a configuration example of a sensor data output unit according to a seventh embodiment.

FIG. 9 is a diagram illustrating a configuration example of a sensor data output unit according to a seventh embodiment of the present invention. A sensor data output unit 31e according to the seventh embodiment includes a force sense data estimation unit 316. A control apparatus 3e according to the present invention is the same as the control apparatus 3 according to the first embodiment except that the control apparatus 3e includes the sensor data output unit 31e in place of the sensor data output unit 31. A mechanical system according to the present embodiment is the same as the mechanical system according to the first embodiment except that the mechanical system according to the present embodiment includes the control apparatus 3e in place of the control apparatus 3. Hereinafter, a point different from the first embodiment will be described, and description overlapping with the first embodiment will be omitted.

Motor current data and motor position data are inputted as sensor data to the force sense data estimation unit 316 for each control period. The force sense data estimation unit 316 not only calculates motor speed and motor acceleration using the motor position data, but also calculates the driving torque on each axis from an equation of motion of the robot 1. Moreover, the force sense data estimation unit 316 calculates a difference between a motor current indicated by the motor current data and a torque calculated from a torque constant, and converts the calculated torque difference into a force and a moment which act on the fingertip of the robot 1, with use of a Jacobian matrix calculated from the motor position data. In the next control period, the force sense data estimation unit 316 outputs, to the determination unit 32, the force and moment acting on the fingertip of the robot 1 which have been obtained by the conversion, as force sense estimate values, that is, estimated force sense values. The determination unit 32 determines the quality of the work by using the inputted force sense estimate values, as in the first embodiment. The sensor data output unit 31e is implemented by a processing circuit as with the sensor data output unit 31. The operations in the present embodiment other than those described above are substantially the same as those in the first embodiment.

As described above, in the present embodiment, the force sense values are estimated with use of the motor current data and the motor position data, and the quality of the work is determined with use of the estimated force sense values. Therefore, it is possible to achieve the same advantageous effect as that of the first embodiment without using a force sensor.

Furthermore, the configuration and operation in the present embodiment may be applied to the mechanical system according to the second embodiment or the fourth embodiment. Moreover, the third embodiment and the present embodiment may be combined so that, for example, the force sense data estimation unit 316 performs processing using the motor current data and the motor position data that have passed through the filter 311.

Eighth Embodiment

Figure 10:
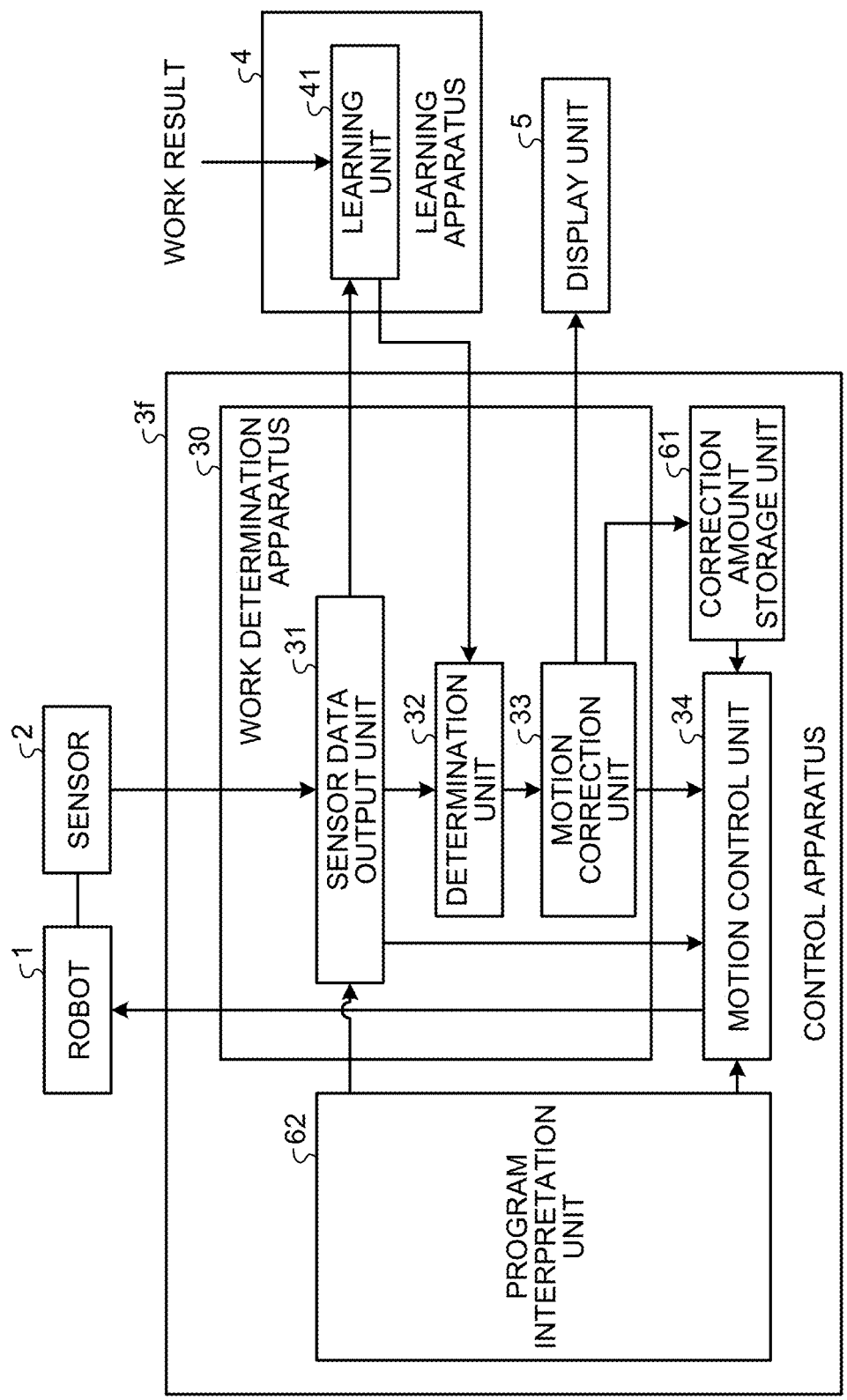
FIG. 10 is a diagram illustrating a configuration example of a mechanical system according to an eighth embodiment.

FIG. 10 is a diagram illustrating a configuration example of a mechanical system according to an eighth embodiment of the present invention. As illustrated in FIG. 10, the mechanical system of the present embodiment is the same as the mechanical system of the second embodiment except that the mechanical system of the present embodiment includes a control apparatus 3f in place of the control apparatus 3a of the second embodiment. A program interpretation unit 62 is added to the control apparatus 3a of the second embodiment to configure the control apparatus 3f. The same constituent elements as those in the second embodiment will be described with the same reference symbols, and description overlapping with the second embodiment will be omitted. Hereinafter, a point different from the second embodiment will be mainly described.

In the present embodiment, a command to start determination of work quality and a command to end the determination of work quality are described in a robot program (program described in a robot language) for causing a robot to operate. That is, in the present embodiment, the start and end of the determination performed by the determination unit 32 are specified by use of the robot program. The robot program can be edited by an operator using a device provided inside or outside the mechanical system. Therefore, the operator can easily specify the start and end of the determination of work quality. The program interpretation unit 62 instructs the sensor data output unit 31 to start the determination of work quality and end the determination according to the robot program. Specifically, the program interpretation unit 62 instructs the sensor data output unit 31 to start outputting the sensor data to the determination unit 32 by processing a command to start the determination of work quality according to the robot program. As a result, the sensor data output unit 31 starts outputting the sensor data to the determination unit 32. Furthermore, the program interpretation unit 62 instructs the sensor data output unit 31 to end the output of the sensor data to the determination unit 32 by processing a command to end the determination of work quality. As a result, the sensor data output unit 31 ends the output of the sensor data to the determination unit 32. The determination unit 32 starts to determine the quality of the work when the input of the sensor data from the sensor data output unit 31 is started, and the determination unit 32 ends the determination of the quality of the work when the input of the sensor data from the sensor data output unit 31 is ended.

The configuration and operation in the present embodiment other than those described above are substantially the same as those of the second embodiment, and so description thereof will be omitted. In the present embodiment, it is possible to achieve the same advantageous effect as that in the second embodiment, and at the same time a user can easily specify a part of work for which quality is to be determined, by editing the robot program. Note that an example in which the program interpretation unit 62 is added to the control apparatus 3a of the second embodiment has been described above, but the present embodiment is not limited to the example, and the configuration and operation in the present embodiment may be combined with the first and third to seventh embodiments.

Ninth Embodiment

Figure 11:
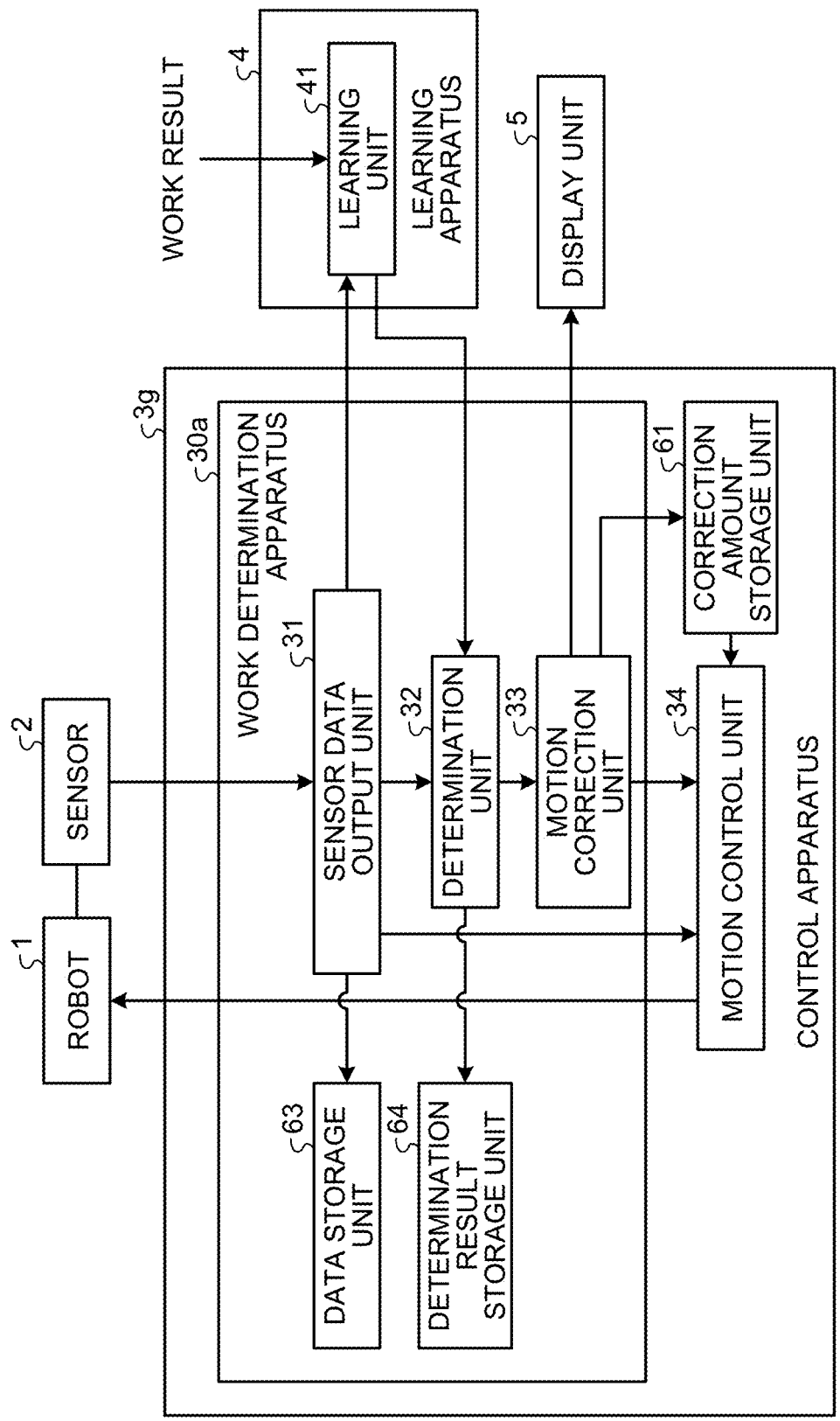
FIG. 11 is a diagram illustrating a configuration example of a mechanical system according to a ninth embodiment.

FIG. 11 is a diagram illustrating a configuration example of a mechanical system according to a ninth embodiment of the present invention. As illustrated in FIG. 11, the mechanical system of the present embodiment is substantially the same as the mechanical system of the second embodiment except that the mechanical system of the present embodiment includes a control apparatus 3g in place of the control apparatus 3a of the second embodiment. The control apparatus 3g is substantially the same as the work determination apparatus 30 of the second embodiment except that the control apparatus 3g includes a work determination apparatus 30a in place of the work determination apparatus 30 of the second embodiment. A data storage unit 63 and a determination result storage unit 64 are added to the work determination apparatus 30 of the second embodiment to configure the work determination apparatus 30a. The same constituent elements as those in the second embodiment will be described with the same reference symbols, and description overlapping with the second embodiment will be omitted. Hereinafter, a point different from the second embodiment will be mainly described.

Note that FIG. 11 illustrates an example in which the data storage unit 63 and the determination result storage unit 64 are provided in the control apparatus 3g, but the present embodiment is not limited to this example, and the data storage unit 63 and the determination result storage unit 64 may be provided in a control apparatus external to the control apparatus 3g, such as a programmable logic controller (PLC), or in a personal computer external to the control apparatus 3g.

The data storage unit 63 stores, as time-series data, sensor data outputted from the sensor data output unit 31 together with identification information on the sensor data. The identification information is, for example, a time stamp, which corresponds to information for identifying which work corresponds to the sensor data and identifying when that work has been performed.

The determination result storage unit 64 stores a determination result finally outputted from the determination unit 32 together with identification information on the determination result. As with the above-described identification information, this identification information is, for example, a time stamp, which corresponds to information for identifying which work corresponds to the determination result and identifying when that work has been performed.

The data sets stored in the data storage unit 63 and the determination result storage unit 64 are transmitted to, for example, a personal computer by which the learning apparatus 4 is implemented, the display unit 5, or the like, and then are displayed thereon. Alternatively, the data sets stored in the data storage unit 63 and the determination result storage unit 64 may be transmitted to a device connected to the control apparatus 3g via a network, such as another personal computer or a PLC.

The configuration and operation in the present embodiment other than those described above are substantially the same as those in the second embodiment, and so description thereof will be omitted. In the present embodiment, the control apparatus 3g can achieve the same advantageous effect as that of the second embodiment, and at the same time can store the past sensor data and determination results. Since the past determination results are stored, the operator can perform analysis thereof at a later date. In addition, a certain time period worth of data that have been stored can be displayed collectively. Note that an example in which in place of the work determination apparatus 30, the work determination apparatus 30a is provided in the control apparatus 3a of the second embodiment has been described above, but the present embodiment is not limited to this example, and the configuration and operation in the present embodiment may be combined with the first and third to eighth embodiments.

Tenth Embodiment

Figure 12:
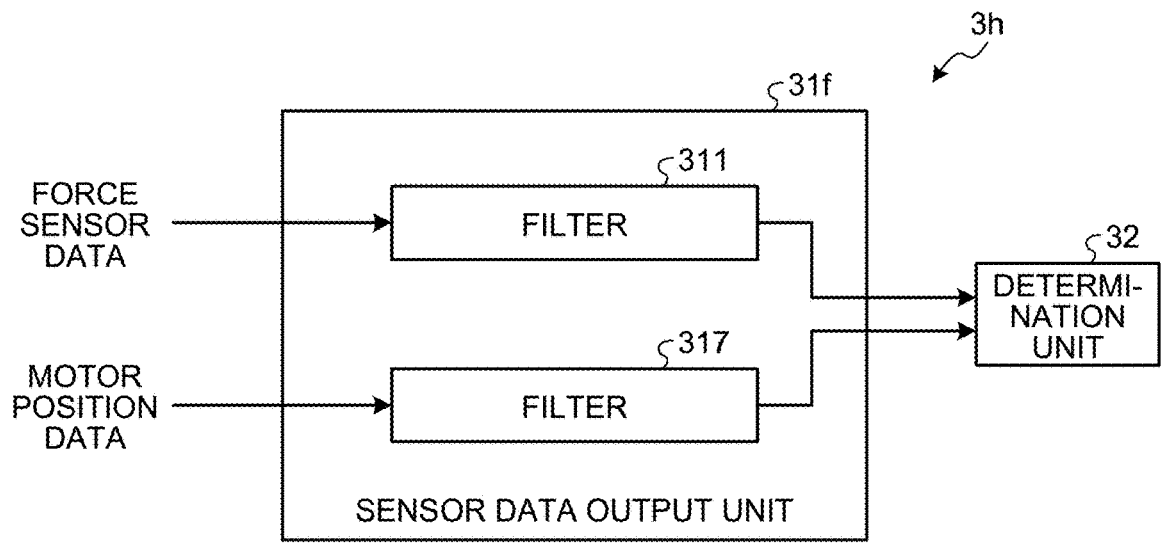
FIG. 12 is a diagram illustrating a configuration example of a sensor data output unit according to a tenth embodiment.

FIG. 12 is a diagram illustrating a configuration example of a sensor data output unit according to a tenth embodiment of the present invention. A sensor data output unit 31f of the tenth embodiment includes the filter 311 described in the third embodiment and a filter 317. The filter 317 is configured by any of a high-pass filter, a band-pass filter, and a low-pass filter. A control apparatus 3h according to the present invention is substantially the same as the control apparatus 3a of the second embodiment except that the control apparatus 3h includes the sensor data output unit 31f in place of the sensor data output unit 31. A mechanical system of the present embodiment is substantially the same as the mechanical system of the second embodiment except that the mechanical system of the present embodiment includes the control apparatus 3h in place of the control apparatus 3a. Hereinafter, a point different from the second embodiment will be described, and description overlapping with the second embodiment will be omitted.

As in the third embodiment, the filter 311 extracts a component in a desired frequency band from the force sensor data, and outputs, as state data, the result of extraction to the determination unit 32. The filter 317 extracts the component in the desired frequency band from the motor position data, and outputs, as state data, the result of extraction to the determination unit 32.

In the case of a six-axis vertical articulated robot, the motor positions of the axes of the robot have six dimensions. In the present embodiment, the output (six-dimensional) of a force sensor and the motor position of each axis of the robot are passed through the filter 311 and the filter 317, respectively, and inputted to the determination unit 32. As a result, the number of inputs to the determination unit 32 is 12.

As described above, it is possible to achieve the same advantageous effect as that of the third embodiment even when the number of inputs is 12, by performing determination after passing the sensor data through the filter as in the third embodiment. Note that an example of replacing the sensor data output unit 31 of the control apparatus 3a according to the second embodiment with the sensor data output unit 31f has been described above, but the present embodiment is not limited to this example, and the configuration and operation in the present embodiment may be combined with the first, third to sixth, eighth, and ninth embodiments.

Eleventh Embodiment

Next, the following describes a method for determining the quality of the work, according to an eleventh embodiment of the present invention. The configuration of a mechanical system of the present embodiment is substantially the same as that of the first embodiment. Note that the method for determining the quality of the work according to the present embodiment may be applied to any of the mechanical systems according to the second to tenth embodiments.

Figure 13:
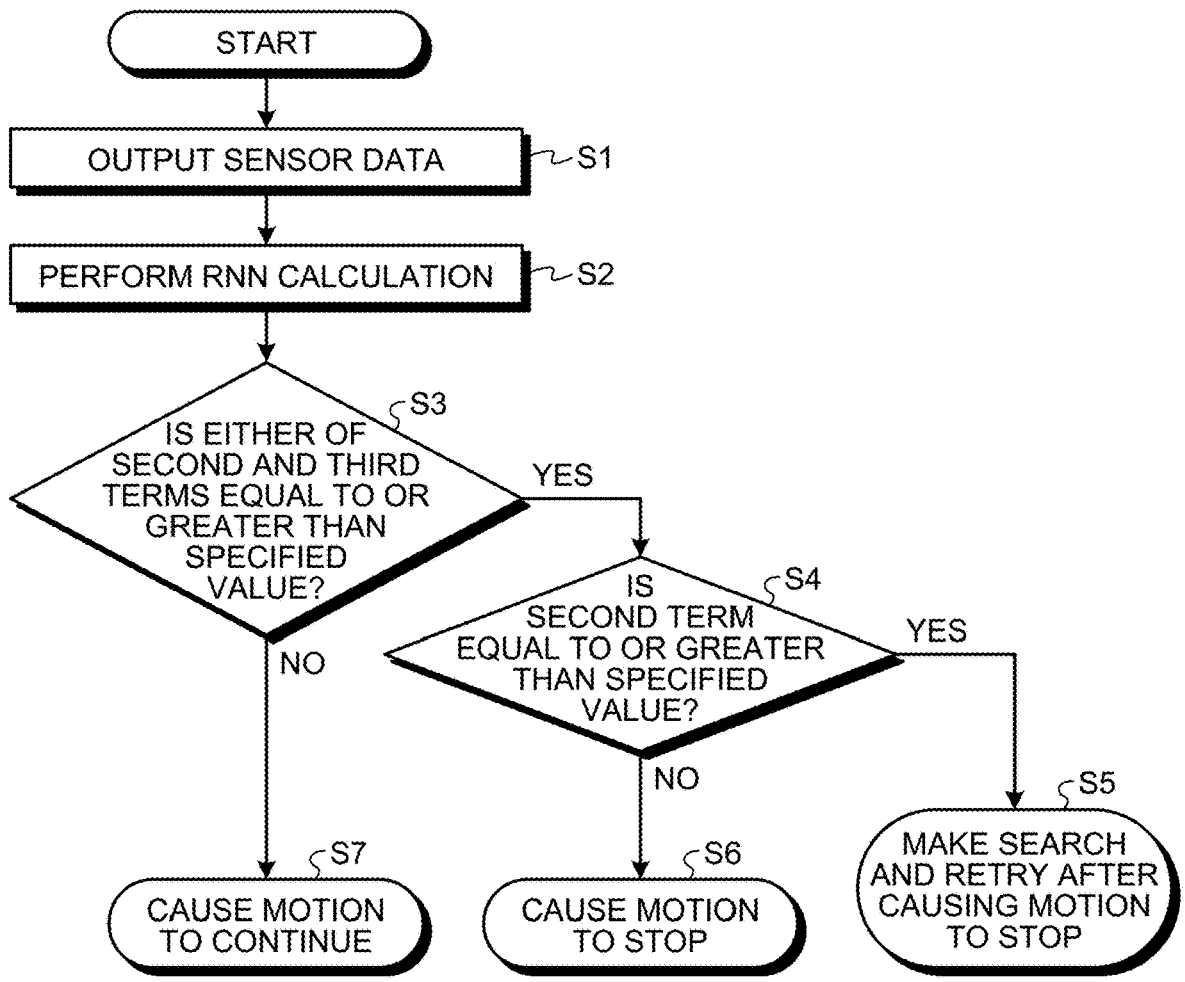
FIG. 13 is a flowchart indicating an example of a method for determining the quality of work, according to an eleventh embodiment.

FIG. 13 is a flowchart indicating an example of a method for determining the quality of a work according to an eleventh embodiment. In the determination method according to the present embodiment, determination is started when the robot 1 starts an assembly work such as cover assembly, connector insertion, board insertion, or shaft fitting, and the determination is ended when the robot 1 finishes that assembly work.

As illustrated in FIG. 13, firstly the sensor data output unit 31 outputs the sensor data (step S1). The sensor data output unit 31 outputs the sensor data for each control period. The sensor data corresponds to a state quantity inside the robot 1, data outputted from a force sensor attached to a wrist of the robot 1, or the like. Examples of the state quantity inside the robot 1 include the position, speed, electric current, and position command of a motor on each axis of the robot 1. Examples of the data outputted from the force sensor include the forces (Fx, Fy, Fz) in the three axial directions and the moments (Mx, My, Mz) around the three axes.

When receiving the sensor data from the sensor data output unit 31, the determination unit 32 performs RNN calculation using the sensor data as an input thereof (step S2). Specifically, the model unit 321 illustrated in FIG. 2, which is included in the determination unit 32, performs the RNN calculation. As described above, since the sensor data is outputted for each control period, the RNN calculation is also performed for each control period. In the RNN calculation, an output from the intermediate layer in the previous control period is stored beforehand, and the weighted sum of the output value in the previous control period and a term calculated from a value on the input side in the current period (output from the input layer) is used as an output from the intermediate layer. A three-dimensional value is outputted from the output layer for each control period.

As described above, a learned model is used in the model unit 321. The learned model is obtained by learning before the start of actual production, by use of a pair of data, that is, time-series data on the forces (Fx, Fy, Fz) in the three axial directions at the time of the assembly work and a work result of that assembly work. In the present embodiment, the robot 1 performs work at a plurality of operating speeds, and collects data. Specifically, the learning is made using the output value (1, 0, 0) when the assembly work has been completed normally, the output value (0, 1, 0) when the assembly work has failed due to intentionally caused misalignment, and the output value (0, 0, 1) when the assembly work has failed due to a partial defect in a component part or irregular adhesion of foreign matter to a component part. Note that in performing learning, the number of dimensions may be increased so as to divide the anomalous states in a component part into a two or more anomaly modes such as defects in parts and adhesion of foreign matter.

After step S2, the anomaly determination unit 322 illustrated in FIG. 2, which is included in the determination unit 32, determines whether either of the second and third terms of a value output from the model unit 321 is equal to or greater than a specified value, that is, at least either one of the second element and the third element of the output value of the model unit 321 is equal to or greater than the specified value (step S3). When determination of No is made in step S3, that is, when both the second element and the third element are less than the specified value, the motion correction unit 33 causes the robot 1 to continue motion without correcting the motion of the robot 1 (step S7).

When determination of Yes is made in step S3, that is, when at least either one of the second element and the third element of the value outputted from the model unit 321 is equal to or greater than the specified value, the anomaly determination unit 322 determines whether the second term, that is, the second element is equal to or greater than the specified value (step S4). When the second element is equal to or greater than the specified value (step S4 Yes), the motion correction unit 33 temporarily stops the robot 1, returns the robot to a predetermined position, performs a search operation, and resumes (retries) the work (step S5). In the search operation, a search is made for a correct position for an appropriate insertion work, based on values of the force sensor and a tactile sensor installed in the robot 1. For example, in the case of the work of inserting a connector into a pin having no cover, the connector held by the robot is thrust at a low speed from two or more directions to derive the position of the pin, and the connector insertion work is performed again at the derived position.

When determination of No is made in step S4, that is, when the third element is equal to or greater than the specified value, the motion correction unit 33 stops the motion of the robot 1 on that point (step S6).

One example of the processing procedure for the method for determining the quality of work, according to the present invention have been described. With this manner, it is possible to achieve the advantageous effect described in the first embodiment.

The configurations set forth in the above embodiments show examples of the contents of the present invention, and can each be combined with other publicly known techniques and partially omitted and/or modified without departing from the scope of the present invention.

REFERENCE SIGNS LIST

1 robot; 2 sensor; 3, 3a, 3b, 3c, 3d, 3e, 3f, 3g, 3h control apparatus; 4 learning apparatus; 5 display unit; 30, 30a work determination apparatus; 31, 31b, 31c, 31d, 31e, 31f sensor data output unit; 32 determination unit; 33 motion correction unit; 34 motion control unit; learning unit; 61 correction amount storage unit; 62 program interpretation unit; 63 data storage unit; 64 determination result storage unit; 311, 317 filter; 312 disturbance estimation unit; 313 subtraction unit; 314 specified value passage determination unit; 315 movement amount calculation unit; 316 force sense data estimation unit; 321 model unit; 322 anomaly determination unit.

The invention claimed is:

1. A work determination apparatus comprising:
   a sensor data output circuit to output state data with an output interval of an integral multiple of a control period with which a motion of an industrial machine is controlled, the state data representing a state of work of the industrial machine; and
   a determination circuit to determine a quality of the work of the industrial machine with the output interval for the state data by making an inference using a recurrent neural network with the output interval for the state data, based on the state data outputted from the sensor data output circuit,
   wherein the output interval is determined such that an amount of movement of the, industrial machine is constant for each output interval.

2. The work determination apparatus according to claim 1, further comprising:
   a motion correction circuit to perform control so as to correct the motion of the industrial machine based on a result of determination of the determination circuit.

3. The work determination apparatus according to claim 2, wherein
   the industrial machine is a robot, and the work is an assembly work,
   the determination circuit further determines a type of anomaly in the work, and
   when the determination circuit determines that there is an anomaly of misalignment of the industrial machine, the motion correction circuit performs control in such a way as to cause the industrial machine to return to a predetermined position and then perform the work again, and when the determination circuit determines that there is an anomaly related to a part to be used in the work, the motion correction circuit performs control in such a way as to stop the robot.

4. The work determination apparatus according to claim 2, wherein
   the industrial machine is a robot, and the work is an assembly work,
   the determination circuit further determines a type of anomaly in the work, and calculates a value representing an amount of misalignment of the industrial machine, and
   when the determination circuit determines that there is an anomaly of misalignment of the industrial machine, the motion correction circuit performs control in such a way as to cause the industrial machine to perform the work again after the motion of the industrial machine is corrected to prevent misalignment with use of the value representing the amount of misalignment, and when the determination circuit determines that there is an anomaly related to a part to be used in the work, the motion correction circuit performs control in such a way as to stop the robot.

5. The work determination apparatus according to claim 4, wherein, when the value representing the amount of misalignment is less than a specified value, the motion correction circuit performs control such that the motion of the industrial machine is not corrected in the work concerned, but the motion of the industrial machine is corrected in the next work of the industrial machine with use of the value representing the amount of misalignment so as to prevent misalignment.

6. The work determination apparatus according to claim wherein the output interval is one time the control period.

7. The work determination apparatus according to claim 1, wherein the sensor data output circuit extracts a component in a desired frequency band from sensor data outputted from a sensor that detects the state of the work of the industrial machine, and outputs an extraction result as the state data.

8. The work determination apparatus according to claim 1, wherein
motor position data and force sensor data are inputted as the state data to the sensor data output circuit, the state data representing the state of the work of the industrial machine, the motor position data corresponding to a result of detecting a position of a motor included in the industrial machine, the force sensor data corresponding to a result of detection obtained by detection of a force sensor provided in the industrial machine, and
the sensor data output circuit estimates a disturbance component contained in a value measured by the force sensor, based on the motor position data, and outputs, as the state data, a result of removing the disturbance component from the force sensor data.

9. The work determination apparatus according to claim 1, wherein
motor position data and motor current data are inputted as the state data to the sensor data output circuit, the state data representing the state of the work of the industrial machine, the motor position data corresponding to a result of detecting a position of a motor included in the industrial machine, the motor current data corresponding to a result of detecting a motor current flowing through the motor, and
the sensor data output circuit estimates a force sense value in the industrial machine based on the motor position data and the motor current data, and outputs the estimated force sense value as the state data.

10. The work determination apparatus according to claim 1, wherein a start and an end of determination performed by the determination circuit are specified using a robot program.

11. The work determination apparatus according to claim 1, further comprising:
a determination result storage circuit, to store a result of determination performed by the determination circuit.

12. The work determination apparatus according to claim 1, wherein
the state data representing the state of the work of the industrial machine includes force sensor data that is a result of detection obtained by a force sensor provided in the industrial machine, and
the sensor data output circuit determines the output interval based on motor position data such that the amount of movement of the industrial machine is constant for each output interval, the motor position data being a result of detecting a position of a motor included in the industrial machine.

13. A work determination apparatus comprising:
a sensor data output circuit to output state data with an output interval of an integral multiple of a control period with which a motion of an industrial machine is controlled, the state data representing a state of work of the industrial machine; and
a determination circuit to determine a quality of the work of the industrial machine with the output interval for the state data by making an inference using a recurrent neural network with the output interval for the state data, based on the state data outputted from the sensor data output circuit, wherein
the output interval is L times the control period, where L is an integer equal to or greater than 2,
sensor data is inputted to the sensor data output circuit for each control period, the sensor data being a result of detecting the state of the work of the industrial machine, and
the sensor data output circuit outputs, as the state data, an average value of the latest L pieces of the sensor data.

14. A work determination method in which a work determination apparatus determines a quality of work of an industrial machine, the method comprising:
a data output step of outputting; state data with an output interval of an integral multiple of a control period with which a motion of the industrial machine is controlled, the state data representing a state of the work of the industrial machine; and
a determination step of determining the quality of the work of the industrial machine with the output interval for the state data by making an inference using a recurrent neural network with the output interval for the state data, based on the state data outputted in the data output step,
wherein the output interval is determined such that an amount of movement of the industrial machine is constant for each output interval.

15. A work determination apparatus comprising:
a sensor data output circuit to output state data with an output interval of an integral multiple of a control period with which a motion of an industrial machine is controlled, the state data representing a state of work of the industrial machine; and
a determination circuit to determine a quality of the work of the industrial machine by inference using a recurrent neural network, based on the state data outputted from the sensor data output circuit,
wherein the output interval is determined such that an amount of movement of the industrial machine is constant for each output interval.

16. The work determination apparatus according to claim 15, wherein
the state data representing the state of the work of the industrial machine includes force sensor data that is a result of detection obtained by a force sensor provided in the industrial machine, and
the sensor data output circuit determines the output interval based on motor position data such that the amount of movement of the industrial machine is constant for each output interval, the motor position data being a result of detecting a position of a motor included in the industrial machine.

17. The work determination apparatus according to claim 15, wherein
the state data representing the state of the work of the industrial machine includes force sensor data that is a result of detection obtained by a force sensor provided in the industrial machine, and
the sensor data output circuit determines the output interval based on motor position data such that the amount of movement of the industrial machine is constant for each output interval, the motor position data being a result of detecting a position of a motor included in the industrial machine.

18. A work determination apparatus comprising:
a sensor data output circuit to output state data with an output interval of an integral multiple of a control period with which a motion of an industrial machine is controlled, the state data representing a state of work of the industrial machine;
a determination circuit to determine a quality of the work of the industrial machine with the output interval for the state data by making an inference using a recurrent neural network with the output interval for the state data, based on the state data outputted from the sensor data output circuit; and
a motion correction circuit to perform control so as to correct the motion of the industrial machine based on a result of determination of the determination circuit, wherein
the determination circuit further determines a type of anomaly in the work, and calculates a value representing an amount of misalignment of the industrial machine, and
when the value representing the amount of misalignment is less than a specified value, the motion correction circuit performs control such that the motion of the industrial machine is not corrected in the work concerned, but the motion of the industrial machine is corrected in the next work of the industrial machine with use of the value representing the amount of misalignment so as to prevent misalignment.

19. The work determination apparatus according to claim 18, wherein the output interval is determined such that an amount of movement of the industrial machine is constant for each output interval.

20. The work determination apparatus according to claim 19, wherein
the state data representing the state of the work of the industrial machine includes force sensor data that is a result of detection obtained by a force sensor provided in the industrial machine, and
the sensor data output circuit determines the output interval based on motor position data such that the amount of movement of the industrial machine is constant for each output interval, the motor position data being a result of detecting a position of a motor included in the industrial machine.

* * * * *